United States Patent
Casagrande et al.

(10) Patent No.: US 8,407,735 B2
(45) Date of Patent: *Mar. 26, 2013

(54) METHODS AND APPARATUS FOR IDENTIFYING SEGMENTS OF CONTENT IN A PRESENTATION STREAM USING SIGNATURE DATA

(75) Inventors: Steven M. Casagrande, Castle Rock, CO (US); David A. Kummer, Highlands Ranch, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 736 days.

This patent is subject to a terminal disclaimer.

(21) Appl. No.: 12/434,751

(22) Filed: May 4, 2009

(65) Prior Publication Data

US 2010/0162344 A1 Jun. 24, 2010

Related U.S. Application Data

(60) Provisional application No. 61/140,789, filed on Dec. 24, 2008.

(51) Int. Cl.
H04N 7/10 (2006.01)
(52) U.S. Cl. ............................................. 725/32; 725/34
(58) Field of Classification Search ............... 725/32–36
See application file for complete search history.

(56) References Cited

U.S. PATENT DOCUMENTS

| | | | |
|---|---|---|---|
| 3,682,363 A | 8/1972 | Hull | |
| 3,919,479 A | 11/1975 | Moon | |
| 3,942,190 A | 3/1976 | Detweiler | |
| 4,224,481 A | 9/1980 | Russell | |
| 4,313,135 A | 1/1982 | Cooper | |
| 4,331,974 A | 5/1982 | Cogswell et al. | |
| 4,388,659 A | 6/1983 | Lemke | |
| 4,404,589 A | 9/1983 | Wright, Jr. | |
| 4,408,309 A | 10/1983 | Kiesling et al. | |
| 4,439,785 A | 3/1984 | Leonard | |
| 4,450,531 A | 5/1984 | Kenyon | |
| 4,520,404 A | 5/1985 | Von Kohorn | |
| 4,602,297 A | 7/1986 | Reese | |
| 4,605,964 A | 8/1986 | Chard | |
| 4,633,331 A | 12/1986 | McGrady et al. | |
| 4,665,431 A | 5/1987 | Cooper | |

(Continued)

FOREIGN PATENT DOCUMENTS

| | | |
|---|---|---|
| EP | 521454 | 1/1993 |
| EP | 594241 | 4/1994 |

(Continued)

OTHER PUBLICATIONS

Final Office Action mailed on Apr. 14, 2011 for U.S. Appl. No. 12/130,792, filed May 30, 2008 in the name of Casagrande.

(Continued)

*Primary Examiner* — Brian T Pendleton
*Assistant Examiner* — Nnenna Ekpo
(74) *Attorney, Agent, or Firm* — Ingrassia Fisher & Lorenz, P.C.

(57) ABSTRACT

Described herein are methods and apparatus for the identification of locations in a presentation stream based on metadata associated with the presentation stream. Locations within a presentation stream are identified using signature data associated with the presentation stream. The identified locations within a presentation stream may be utilized to identify boundaries of segments within the presentation stream, such as logical chapters, scenes or other sections of the content. The identified segments of the presentation stream may then be selectably viewed by a user.

14 Claims, 19 Drawing Sheets

U.S. PATENT DOCUMENTS

| | | | |
|---|---|---|---|
| 4,697,209 A | 9/1987 | Kiewit | |
| 4,706,121 A | 11/1987 | Young | |
| 4,739,398 A | 4/1988 | Thomas | |
| 4,750,213 A | 6/1988 | Novak | |
| 4,755,889 A | 7/1988 | Schwartz | |
| 4,760,442 A | 7/1988 | O'Connell et al. | |
| 4,761,694 A | 8/1988 | Shudo et al. | |
| 4,789,961 A | 12/1988 | Tindall | |
| 4,805,217 A | 2/1989 | Morihiro et al. | |
| 4,816,905 A | 3/1989 | Tweedy et al. | |
| 4,833,710 A | 5/1989 | Hirashima | |
| 4,876,670 A | 10/1989 | Nakabayashi | |
| 4,888,769 A | 12/1989 | Deal | |
| 4,891,715 A | 1/1990 | Levy | |
| 4,897,867 A | 1/1990 | Foster et al. | |
| 4,916,682 A | 4/1990 | Tomoda et al. | |
| 4,918,730 A | 4/1990 | Schulze | |
| 4,920,533 A | 4/1990 | Dufresne et al. | |
| 4,930,160 A | 5/1990 | Vogel | |
| 4,939,594 A | 7/1990 | Moxon et al. | |
| 4,947,244 A | 8/1990 | Fenwick et al. | |
| 4,949,169 A | 8/1990 | Lumelsky et al. | |
| 4,949,187 A | 8/1990 | Cohen | |
| 4,963,866 A | 10/1990 | Duncan | |
| 4,963,995 A | 10/1990 | Lang | |
| 4,972,190 A | 11/1990 | Primeau et al. | |
| 4,974,085 A | 11/1990 | Campbell et al. | |
| RE33,535 E | 2/1991 | Cooper | |
| 4,991,033 A | 2/1991 | Takeshita | |
| 5,014,125 A | 5/1991 | Pocock et al. | |
| 5,057,932 A | 10/1991 | Lang | |
| 5,063,453 A | 11/1991 | Yoshimura et al. | |
| 5,093,718 A | 3/1992 | Hoarty et al. | |
| 5,121,476 A | 6/1992 | Yee | |
| 5,126,852 A | 6/1992 | Nishino et al. | |
| 5,126,982 A | 6/1992 | Yifrach | |
| 5,130,792 A | 7/1992 | Tindell et al. | |
| 5,132,992 A | 7/1992 | Yurt et al. | |
| 5,134,499 A | 7/1992 | Sata et al. | |
| 5,168,353 A | 12/1992 | Walker | |
| 5,191,410 A | 3/1993 | McCalley et al. | |
| 5,202,761 A | 4/1993 | Cooper | |
| 5,227,876 A | 7/1993 | Cucchi et al. | |
| 5,233,423 A | 8/1993 | Jernigan et al. | |
| 5,241,428 A | 8/1993 | Goldwasser et al. | |
| 5,245,430 A | 9/1993 | Nishimura | |
| 5,247,347 A | 9/1993 | Litteral et al. | |
| 5,253,275 A | 10/1993 | Yurt et al. | |
| 5,311,423 A | 5/1994 | Clark | |
| 5,329,320 A | 7/1994 | Yifrach | |
| 5,333,091 A | 7/1994 | Iggulden | |
| 5,357,276 A | 10/1994 | Banker et al. | |
| 5,361,261 A | 11/1994 | Edem et al. | |
| 5,371,551 A | 12/1994 | Logan et al. | |
| 5,412,416 A | 5/1995 | Nemirofsky | |
| 5,414,455 A | 5/1995 | Hooper et al. | |
| 5,434,678 A | 7/1995 | Abecassis | |
| 5,438,423 A | 8/1995 | Lynch | |
| 5,440,334 A | 8/1995 | Walters et al. | |
| 5,442,390 A | 8/1995 | Hooper et al. | |
| 5,442,455 A | 8/1995 | Hioki et al. | |
| 5,452,006 A | 9/1995 | Auld | |
| 5,453,790 A | 9/1995 | Vermeulen et al. | |
| 5,461,415 A | 10/1995 | Wolf et al. | |
| 5,461,428 A | 10/1995 | Yoo | |
| 5,477,263 A | 12/1995 | O'Callaghan et al. | |
| 5,481,542 A | 1/1996 | Logston et al. | |
| 5,508,940 A | 4/1996 | Rossmer et al. | |
| 5,513,011 A | 4/1996 | Matsumoto et al. | |
| 5,517,250 A | 5/1996 | Hoogenboom et al. | |
| 5,521,630 A | 5/1996 | Chen et al. | |
| 5,528,282 A | 6/1996 | Voeten et al. | |
| 5,533,021 A | 7/1996 | Branstad et al. | |
| 5,535,137 A | 7/1996 | Rossmere et al. | |
| 5,535,229 A | 7/1996 | Hain, Jr. et al. | |
| 5,537,408 A | 7/1996 | Branstad et al. | |
| 5,541,919 A | 7/1996 | Young et al. | |
| 5,550,594 A | 8/1996 | Cooper et al. | |
| 5,555,463 A | 9/1996 | Staron et al. | |
| 5,555,555 A | 9/1996 | Sato et al. | |
| 5,557,538 A | 9/1996 | Reter et al. | |
| 5,557,541 A | 9/1996 | Schulhof et al. | |
| 5,559,999 A | 9/1996 | Maturi et al. | |
| 5,563,714 A | 10/1996 | Inoue et al. | |
| 5,572,261 A | 11/1996 | Cooper | |
| 5,574,662 A | 11/1996 | Windrem et al. | |
| 5,581,479 A | 12/1996 | McLaughlin et al. | |
| 5,583,561 A | 12/1996 | Baker et al. | |
| 5,583,652 A | 12/1996 | Ware | |
| 5,586,264 A | 12/1996 | Belknap et al. | |
| 5,600,364 A | 2/1997 | Hendricks et al. | |
| 5,603,058 A | 2/1997 | Belknap et al. | |
| 5,604,544 A | 2/1997 | Bertram | |
| 5,610,653 A | 3/1997 | Abecassis | |
| 5,614,940 A | 3/1997 | Cobbley | |
| 5,619,337 A | 4/1997 | Naimpally | |
| 5,625,464 A | 4/1997 | Compoint et al. | |
| 5,629,732 A | 5/1997 | Moskowitz et al. | |
| 5,642,171 A | 6/1997 | Baumgartner et al. | |
| 5,648,824 A | 7/1997 | Dunn | |
| 5,659,539 A | 8/1997 | Porter et al. | |
| 5,664,044 A | 9/1997 | Ware | |
| 5,668,948 A | 9/1997 | Belknap et al. | |
| 5,675,388 A | 10/1997 | Cooper | |
| 5,682,488 A | 10/1997 | Gleason et al. | |
| 5,684,918 A | 11/1997 | Abecassis | |
| 5,692,093 A | 11/1997 | Iggulden | |
| 5,696,866 A | 12/1997 | Iggulden | |
| 5,696,868 A | 12/1997 | Kim et al. | |
| 5,696,869 A | 12/1997 | Abecassis | |
| 5,701,383 A | 12/1997 | Russo et al. | |
| 5,703,655 A | 12/1997 | Corey | |
| 5,706,388 A | 1/1998 | Isaka | |
| 5,712,976 A | 1/1998 | Falcon, Jr. et al. | |
| D390,839 S | 2/1998 | Yamamoto et al. | |
| 5,715,356 A | 2/1998 | Hirayama et al. | |
| 5,719,982 A | 2/1998 | Kawamura et al. | |
| 5,721,815 A | 2/1998 | Ottesen et al. | |
| 5,721,878 A | 2/1998 | Ottesen et al. | |
| D392,269 S | 3/1998 | Mason et al. | |
| 5,724,474 A | 3/1998 | Oguro et al. | |
| 5,742,730 A | 4/1998 | Couts | |
| 5,751,282 A | 5/1998 | Girard et al. | |
| 5,751,883 A | 5/1998 | Ottesen et al. | |
| 5,761,417 A | 6/1998 | Henley et al. | |
| 5,774,170 A | 6/1998 | Hite et al. | |
| 5,774,186 A | 6/1998 | Brodsky | |
| 5,778,137 A | 7/1998 | Nielsen et al. | |
| 5,805,763 A | 9/1998 | Lawler et al. | |
| 5,805,821 A | 9/1998 | Saxena et al. | |
| 5,808,607 A | 9/1998 | Brady et al. | |
| 5,815,689 A | 9/1998 | Shaw et al. | |
| 5,822,493 A | 10/1998 | Uehara et al. | |
| 5,864,682 A | 1/1999 | Porter et al. | |
| 5,870,553 A | 2/1999 | Shaw et al. | |
| 5,889,915 A | 3/1999 | Hewton | |
| 5,892,536 A | 4/1999 | Logan | |
| 5,892,884 A | 4/1999 | Sugiyama et al. | |
| 5,899,578 A | 5/1999 | Yanagihara et al. | |
| 5,920,572 A | 7/1999 | Washington et al. | |
| 5,930,444 A | 7/1999 | Camhi et al. | |
| 5,930,493 A | 7/1999 | Ottesen et al. | |
| 5,949,954 A | 9/1999 | Young et al. | |
| 5,953,485 A | 9/1999 | Abecassis | |
| 5,956,716 A | 9/1999 | Kenner et al. | |
| 5,973,679 A | 10/1999 | Abbott et al. | |
| 5,987,210 A | 11/1999 | Iggulden | |
| 5,995,709 A | 11/1999 | Tsuge | |
| 5,999,688 A | 12/1999 | Iggulden | |
| 5,999,689 A | 12/1999 | Iggulden | |
| 5,999,691 A | 12/1999 | Takagi et al. | |
| 6,002,443 A | 12/1999 | Iggulden | |
| 6,002,832 A | 12/1999 | Yoneda | |
| 6,005,562 A | 12/1999 | Shiga et al. | |
| 6,005,564 A | 12/1999 | Ahmad et al. | |
| 6,005,603 A | 12/1999 | Flavin | |
| 6,018,612 A | 1/2000 | Thomason et al. | |

| | | | |
|---|---|---|---|
| 6,028,599 A | 2/2000 | Yuen et al. | |
| 6,055,495 A | 4/2000 | Tucker et al. | |
| D424,543 S | 5/2000 | Hodgson | |
| 6,057,893 A * | 5/2000 | Kojima et al. ............... 348/700 | |
| D426,208 S | 6/2000 | Hodgson | |
| D426,209 S | 6/2000 | Hodgson | |
| 6,088,455 A | 7/2000 | Logan | |
| 6,091,886 A | 7/2000 | Abecassis | |
| RE36,801 E | 8/2000 | Logan et al. | |
| 6,100,941 A | 8/2000 | Dimitrova et al. | |
| 6,112,226 A | 8/2000 | Weaver et al. | |
| 6,138,147 A | 10/2000 | Weaver et al. | |
| 6,151,444 A | 11/2000 | Abecassis | |
| 6,163,644 A | 12/2000 | Owashi et al. | |
| 6,167,083 A | 12/2000 | Sporer et al. | |
| 6,169,843 B1 | 1/2001 | Lenihan et al. | |
| 6,192,189 B1 | 2/2001 | Fujinami et al. | |
| 6,198,877 B1 | 3/2001 | Kawamura et al. | |
| 6,208,804 B1 | 3/2001 | Ottesen et al. | |
| 6,208,805 B1 | 3/2001 | Abecassis | |
| 6,226,447 B1 | 5/2001 | Sasaki et al. | |
| 6,232,926 B1 | 5/2001 | Nguyen et al. | |
| 6,233,389 B1 | 5/2001 | Barton | |
| 6,243,676 B1 | 6/2001 | Whitteman | |
| 6,278,837 B1 | 8/2001 | Yasukohchi et al. | |
| 6,285,824 B1 | 9/2001 | Yanagihara et al. | |
| 6,304,714 B1 | 10/2001 | Krause et al. | |
| 6,330,675 B1 | 12/2001 | Wiser et al. | |
| 6,335,730 B1 | 1/2002 | Gould | |
| 6,341,195 B1 | 1/2002 | Mankovitz et al. | |
| D454,574 S | 3/2002 | Wasko et al. | |
| 6,400,407 B1 | 6/2002 | Zigmond et al. | |
| 6,404,977 B1 | 6/2002 | Iggulden | |
| 6,408,128 B1 | 6/2002 | Abecassis | |
| 6,424,791 B1 | 7/2002 | Saib | |
| 6,425,127 B1 | 7/2002 | Bates et al. | |
| 6,445,738 B1 | 9/2002 | Zdepski et al. | |
| 6,445,872 B1 | 9/2002 | Sano et al. | |
| 6,452,615 B1 | 9/2002 | Chiu et al. | |
| 6,490,000 B1 | 12/2002 | Schaefer et al. | |
| 6,498,894 B2 | 12/2002 | Ito et al. | |
| 6,504,990 B1 | 1/2003 | Abecassis | |
| D470,153 S | 2/2003 | Billmaier et al. | |
| 6,529,685 B2 | 3/2003 | Ottesen et al. | |
| 6,542,695 B1 | 4/2003 | Akiba et al. | |
| 6,553,178 B2 | 4/2003 | Abecassis | |
| 6,574,594 B2 | 6/2003 | Pitman | |
| 6,597,405 B1 | 7/2003 | Iggulden | |
| 6,677,967 B2 | 1/2004 | Sawano et al. | |
| 6,698,020 B1 | 2/2004 | Zigmond | |
| 6,701,355 B1 | 3/2004 | Brandt et al. | |
| 6,718,551 B1 | 4/2004 | Swix | |
| 6,760,017 B1 | 7/2004 | Banerjee et al. | |
| 6,771,316 B1 | 8/2004 | Iggulden | |
| 6,788,882 B1 | 9/2004 | Geer et al. | |
| D499,740 S | 12/2004 | Ombao et al. | |
| 6,850,691 B1 | 2/2005 | Stam | |
| 6,856,758 B2 | 2/2005 | Iggulden | |
| 6,931,451 B1 | 8/2005 | Logan | |
| 6,978,470 B2 | 12/2005 | Swix | |
| 7,032,177 B2 | 4/2006 | Novak | |
| 7,032,179 B2 | 4/2006 | Mack et al. | |
| D521,521 S | 5/2006 | Jewitt et al. | |
| 7,055,166 B1 | 5/2006 | Logan | |
| 7,058,376 B2 | 6/2006 | Logan | |
| 7,072,849 B1 | 7/2006 | Filepp et al. | |
| 7,110,658 B1 | 9/2006 | Iggulden | |
| 7,187,884 B2 | 3/2007 | Bardolatzy et al. | |
| 7,197,758 B1 | 3/2007 | Blackketter | |
| D539,809 S | 4/2007 | Totten et al. | |
| 7,243,362 B2 | 7/2007 | Swix | |
| 7,251,413 B2 | 7/2007 | Dow | |
| 7,266,832 B2 | 9/2007 | Miller | |
| 7,269,330 B1 | 9/2007 | Iggulden | |
| 7,272,298 B1 | 9/2007 | Lang et al. | |
| D554,140 S | 10/2007 | Armendariz | |
| D558,220 S | 12/2007 | Maitlen et al. | |
| 7,319,761 B2 | 1/2008 | Bianchi et al. | |
| 7,320,137 B1 | 1/2008 | Novak | |
| 7,376,469 B2 | 5/2008 | Eischeid et al. | |
| 7,430,360 B2 | 9/2008 | Abecassis | |
| D596,646 S | 7/2009 | Wani | |
| D604,308 S | 11/2009 | Takano | |
| 7,631,331 B2 | 12/2009 | Sie | |
| 7,634,785 B2 | 12/2009 | Smith | |
| 7,661,121 B2 | 2/2010 | Smith | |
| 7,779,438 B2 | 8/2010 | Davies | |
| 7,889,964 B1 | 2/2011 | Barton | |
| 2002/0069218 A1 | 6/2002 | Sull et al. | |
| 2002/0090198 A1 | 7/2002 | Rosenberg | |
| 2002/0092017 A1 | 7/2002 | Klosterman | |
| 2002/0092022 A1 | 7/2002 | Dudkicwicz | |
| 2002/0097235 A1 | 7/2002 | Rosenberg | |
| 2002/0120925 A1 | 8/2002 | Logan | |
| 2002/0124249 A1 | 9/2002 | Shintani | |
| 2002/0131511 A1 | 9/2002 | Zenoni | |
| 2002/0169540 A1 | 11/2002 | Engstrom | |
| 2002/0184047 A1 | 12/2002 | Plotnick | |
| 2003/0005052 A1 | 1/2003 | Feuer | |
| 2003/0031455 A1 | 2/2003 | Sagar | |
| 2003/0031458 A1 | 2/2003 | Takahashi | |
| 2003/0066078 A1 | 4/2003 | Bjorgan | |
| 2003/0084451 A1 | 5/2003 | Pierzga | |
| 2003/0093790 A1 | 5/2003 | Logan | |
| 2003/0154128 A1 | 8/2003 | Liga | |
| 2003/0192060 A1 | 10/2003 | Levy | |
| 2003/0202773 A1 | 10/2003 | Dow | |
| 2003/0231854 A1 | 12/2003 | Derrenberger | |
| 2004/0010807 A1 | 1/2004 | Urdang | |
| 2004/0040042 A1 | 2/2004 | Feinleib | |
| 2004/0049780 A1 | 3/2004 | Gee | |
| 2004/0083484 A1 | 4/2004 | Annon Ryal | |
| 2004/0172650 A1 | 9/2004 | Hawkins et al. | |
| 2004/0177317 A1 | 9/2004 | Bradstreet | |
| 2004/0189873 A1 | 9/2004 | Konig | |
| 2004/0190853 A1 | 9/2004 | Dow | |
| 2004/0244035 A1 | 12/2004 | Wright et al. | |
| 2004/0255330 A1 | 12/2004 | Logan | |
| 2004/0255334 A1 | 12/2004 | Logan | |
| 2004/0255336 A1 | 12/2004 | Logan | |
| 2005/0005308 A1 | 1/2005 | Logan | |
| 2005/0020223 A1 | 1/2005 | Ellis et al. | |
| 2005/0025469 A1 | 2/2005 | Geer et al. | |
| 2005/0044561 A1 | 2/2005 | McDonald | |
| 2005/0076359 A1 | 4/2005 | Pierson | |
| 2005/0081252 A1 | 4/2005 | Chefalas | |
| 2005/0132418 A1 | 6/2005 | Barton et al. | |
| 2005/0262539 A1 | 11/2005 | Barton | |
| 2006/0013555 A1 | 1/2006 | Poslinski | |
| 2006/0015925 A1 | 1/2006 | Logan | |
| 2006/0059426 A1 | 3/2006 | Ogikubo | |
| 2006/0115058 A1 | 6/2006 | Alexander et al. | |
| 2006/0143567 A1 | 6/2006 | Chiu et al. | |
| 2006/0168630 A1 | 7/2006 | Davies | |
| 2006/0218617 A1 | 9/2006 | Bradstreet | |
| 2006/0277564 A1 | 12/2006 | Jarman | |
| 2006/0277569 A1 | 12/2006 | Smith | |
| 2006/0280437 A1 | 12/2006 | Logan | |
| 2006/0288374 A1 | 12/2006 | Ferris | |
| 2006/0288392 A1 | 12/2006 | Fleming | |
| 2007/0050827 A1 | 3/2007 | Gibbon | |
| 2007/0113250 A1 | 5/2007 | Logan | |
| 2007/0124758 A1 | 5/2007 | Sung | |
| 2007/0136742 A1 | 6/2007 | Sparrell | |
| 2007/0156739 A1 | 7/2007 | Black | |
| 2007/0168543 A1 | 7/2007 | Krikorian | |
| 2007/0199013 A1* | 8/2007 | Samari et al. ................... 725/20 | |
| 2007/0204288 A1 | 8/2007 | Candelore | |
| 2007/0212030 A1 | 9/2007 | Koga et al. | |
| 2007/0214473 A1 | 9/2007 | Barton | |
| 2007/0276926 A1 | 11/2007 | Lajoie | |
| 2007/0300249 A1 | 12/2007 | Smith et al. | |
| 2007/0300250 A1* | 12/2007 | Smith et al. ................... 725/20 | |
| 2007/0300258 A1 | 12/2007 | O'Connor | |
| 2008/0013927 A1 | 1/2008 | Kelly et al. | |
| 2008/0036917 A1 | 2/2008 | Pascarella | |
| 2008/0052739 A1 | 2/2008 | Logan | |
| 2008/0059997 A1 | 3/2008 | Plotnick et al. | |

| | | | |
|---|---|---|---|
| 2008/0112690 | A1 | 5/2008 | Shahraray |
| 2008/0155627 | A1 | 6/2008 | O'Connor |
| 2008/0183587 | A1 | 7/2008 | Joo et al. |
| 2008/0267584 | A1 | 10/2008 | Green |
| 2009/0093278 | A1 | 4/2009 | Negron et al. |
| 2009/0304358 | A1 | 12/2009 | Rashkovskiy |
| 2010/0138761 | A1 | 6/2010 | Barnes |
| 2011/0194838 | A1 | 8/2011 | Meijer |
| 2011/0197224 | A1 | 8/2011 | Meijer |

FOREIGN PATENT DOCUMENTS

| | | |
|---|---|---|
| EP | 625858 | 11/1994 |
| EP | 645929 | 3/1995 |
| EP | 726574 | 8/1996 |
| EP | 785675 | 7/1997 |
| EP | 817483 | 1/1998 |
| EP | 1536362 | 6/2005 |
| EP | 1705908 | 9/2006 |
| GB | 2222742 | 3/1990 |
| GB | 2320637 | 6/1998 |
| JP | 06-233234 | 8/1994 |
| JP | 06-245157 | 9/1994 |
| JP | 07-111629 | 4/1995 |
| JP | 07-131754 | 5/1995 |
| JP | 07-250305 | 9/1995 |
| JP | 07-264529 | 10/1995 |
| JP | 2001 359079 | 12/2001 |
| JP | 2003153114 | 5/2003 |
| JP | 2006 262057 | 9/2006 |
| JP | 2008 131150 | 6/2008 |
| WO | WO 92/22983 | 12/1992 |
| WO | WO 95/09509 | 4/1995 |
| WO | WO 95/32584 | 11/1995 |
| WO | WO 01/22729 | 3/2001 |
| WO | 0223903 A | 3/2002 |

OTHER PUBLICATIONS

Final Office Action mailed on Apr. 27, 2011 for U.S. Appl. No. 12/135,360, filed Jun. 9, 2008 in the name of Casagrande.
Invitation to Pay Fees and Partial Search Report for PCT/EP2011/051335 mailed on May 16, 2011.
Office Action mailed on Jun. 2, 2011 for U.S. Appl. No. 11/942,111, filed Nov. 19, 2007 in the name of Casagrande.
Satterwhite, "Autodetection of TV Commericals," 2004.
Office Action mailed on Jun. 7, 2011 for U.S. Appl. No. 11/942,901, filed Nov. 20, 2007 in the name of Casagrande.
International Search Report for PCT/US2009/069019 mailed on Apr. 14, 2010.
International Search Report for PCT/US2010/038836 mailed on Oct. 1, 2010.
OA mailed on Oct. 27, 2010 for U.S. Appl. No. 12/130,792 filed May 30, 2008 in the name of Casagrande.
Final OA mailed on Nov. 16, 2010 for U.S. Appl. No. 11/942,896, filed Nov. 20, 2007 in the name of Hodge.
OA mailed on Nov. 29, 2010 for U.S. Appl. No. 12/135,360, filed Jun. 9, 2008 in the name of Casagrande.
Dimitrova, N., et al, "Real Time Commerical Detection Using MPEG Features", Philips Research.
"Paramount Pictures Corp. v. ReplayTV & SonicBlue", http://www.eff.org/IP/Video/Paramount v. ReplayTV/20011031_complaint.html, Complaint Filed, (Oct. 30, 2001).
Manjoo, Farhad, "They Know What You're Watching", Wired News, http://www.wired.com/news/politics/0.1283.52302.00.html, (May 2, 2002).
Haughey, Matt, "EFF's ReplayTV Suit Ends", http://www.pvrblog.com/pvr/2004/01/effs_replaytv_s.html, (Jan. 12, 2004).
Mizutani, Masami, et al, "Commerical Detection in Heterogeneous Video Streams Using Fused Multi-Modal and Temporal Features", IEEE ICASSP, 2005, Philadelphia, (Mar. 22, 2005).
Tew, Chris, "How MythTV Detects Commericals", http://www.pvrwire.com/2006/10/27/how-mythtv-detects-commericals/, (Oct. 27, 2006).
RCA, "RCA DRC8060N DVD Recorder", http://www.pricegrabber.com/rating_getprodrev.php/product_id=12462074/id, PriceGrabber.com, (Jan. 26, 2007).
"How to Write a New Method of Commercial Detection", MythTV, http://www.mythtv.org/wiki/index.php/How to Write a New Method of Commerical Detection, (Jan. 26, 2007).
"Comskip", http://www.kaashoek.com/comskip/, commerical detector, (Jan. 26, 2007).
Casagrande, Steven; U.S. Appl. No. 11/942,111, filed Nov. 19, 2007.
Hodge, Kenneth; U.S. Appl. No. 11/942,896, filed Nov. 20, 2007.
Casagrande, Steven; U.S. Appl. No. 11/942,901, filed Nov. 20, 2007.
OA mailed on May 24, 2010 for U.S. Appl. No. 11/942,896, filed Nov. 20, 2007 in the name of Hodge.
Gratton, Max; U.S. Appl. No. 12/052,623, filed Mar. 20, 2008.
Casagrande, Steven; U.S. Appl. No. 12/130,792, filed May 30, 2008.
Casagrande, Steven; U.S. Appl. No. 12/135,360, filed Jun. 9, 2008.
Casagrande, Steven; U.S. Appl. No. 12/434,742, filed May 4, 2009.
Casagrande, Steven; U.S. Appl. No. 12/434,746, filed May 4, 2009.
ISR for PCT/US2009/037183 mailed on Jul. 15, 2009.
Casagrande, Steven; U.S. Appl. No. 12/486,641, filed Jun. 17, 2009.
Japan Patent Office "Notice of Rejection Ground" mailed Sep. 4, 2012 for Japanese Patent Appln. No. 2011-500879.
Canadian Patent Office "Office Action" mailed Jul. 23, 2012 for Canadian Patent Appln. No. 2,717,933.
USPTO "Non-Final Office Action" mailed Sep. 6, 2012 for U.S. Appl. No. 12/135,360, filed Jun. 9, 2008.
USPTO "Non-Final Office Action" mailed Sep. 25, 2012 for U.S. Appl. No. 12/052,623, filed Mar. 20, 2008.
Australian Patent Office "Patent Examination Report No. 2" mailed Jul. 12, 2012 for AU Patent Appln. 2009225834.
USPTO "Final Office Action" mailed Jul. 19, 2012 for U.S. Appl. No. 12/434,742, filed May 4, 2009.
USPTO "Non-Final Office Action" mailed Oct. 16, 2012 for U.S. Appl. No. 12/486,641, filed Jun. 17, 2009.
USPTO "Final Office Action" mailed Oct. 17, 2012 for U.S. Appl. No. 12/703,049, filed Feb. 9, 2010.
State Intellectual Property Office "Office Action" mailed Sep. 24, 2012 for Chinese Patent Appln. No. 200980109447.X.
Pogue, David "Networks Start to Offer TV on the Web" The New York Times, Oct. 18, 2007; retrieved from the internet at http://www.nytimes.com/007/10/18/technology/circuits/18pogue.html?pagewanted=print on Aug. 1, 2012.
TIVO "TIVO Launches Remote Scheduling With Verizon Wireless," Mar. 14, 2007.
Associated Press "AT&T Lets Mobile Phones Control Your Television," Mar. 6, 2007.
Canadian Intellectual Property Office, "Office Action" mailed Feb. 27, 2012; Canadian Appln. No. 2,665,850.
USPTO "Final Office Action" mailed May 10, 2012; U.S. Appl. No. 12/486,641, filed Jun. 17, 2009.
Casagrande "Office Action Response" filed Sep. 2, 2011 for U.S. Appl. No. 11/942,111 (ES-1209).
Casagrande "Office Action Response" filed on Sep. 7, 2011 for U.S. Appl. No. 11/942,901 (ES-1211).
USPTO "Notice of Allowance" mailed on Sep. 27, 2011 for U.S. Appl. No. 11/942,901 (ES-1211) in the name of Casagrande.
USPTO "Notice of Allowance" mailed on Oct. 14, 2011 for U.S. Appl. No. 11/942,111 (ES-1209) in the name of Casagrande.
China State Intellectual Property Office "First Office Action" mailed on Oct. 28, 2011 for Chinese Application No. 200980109447.X.
Canadian Intellectual Property Office "Office Action" mailed on Jun. 27, 2011 for Canadian Application 2,665,855.
USPTO "Non-Final Office Action" mailed Jan. 30, 2012 for U.S. Appl. No. 12/486,641 in the name of Casagrande.
USPTO "Notice of Allowance" mailed Dec. 5, 2011 for U.S. Appl. No. 12/130,792 in the name of Casagrande.
USPTO "Non-Final Office Action" mailed Feb. 7, 2012 for U.S. Appl. No. 12/434,742 in the name of Casagrande.
USPTO "Non-Final Office Action" mailed Feb. 13, 2012 for U.S. Appl. No. 12/434,746 in the name of Casagrande.
USPTO "Notice of Allowance" mailed Jan. 27, 2012 for U.S. Appl. No. 11/942,896 in the name of Hodge.
USPTO "Final Office Action" mailed Jan. 31, 2012 for U.S. Appl. No. 12/052,623 in the name of Gratton.
Australian Patent Office "Office Action" mailed on Jun. 9, 2011 for Australian Application No. 2009225834.

Canadian Intellectual Property Office "Office Action" mailed on Aug. 31, 2011 for Canadian Application 2,717,933.
Casagrande "Office Action Response" filed Aug. 15, 2011 for U.S. Appl. No. 12/130,792.
USPTO "Advisory Action" mailed Jul. 1, 2011 for U.S. Appl. No. 12/130,792 in the name of Casagrande.
Casagrande "Office Action Response" filed Aug. 15, 2011 for U.S. Appl. No. 12/135,360.
Casagrande "Office Action Response" filed Jun. 13, 2011 for U.S. Appl. No. 12/130,792.
USPTO "Non-Final Office Action" mailed Oct. 3, 2011 for U.S. Appl. No. 11/942,896 in the name of Hodge.
European Patent Office, "European Search Report" mailed Feb. 24, 2012; International Appln. No. 08169362.4-1241/2061239.

* cited by examiner

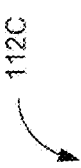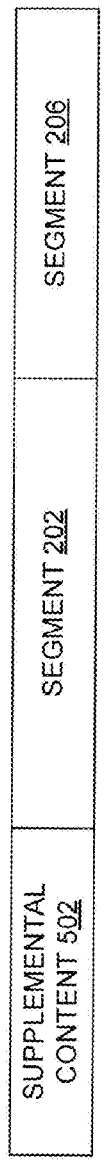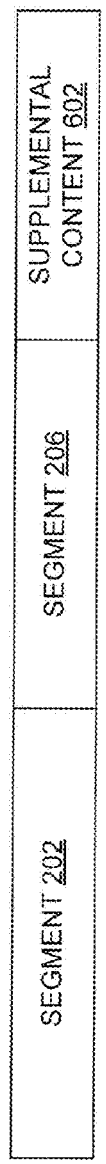
FIG. 5
FIG. 6

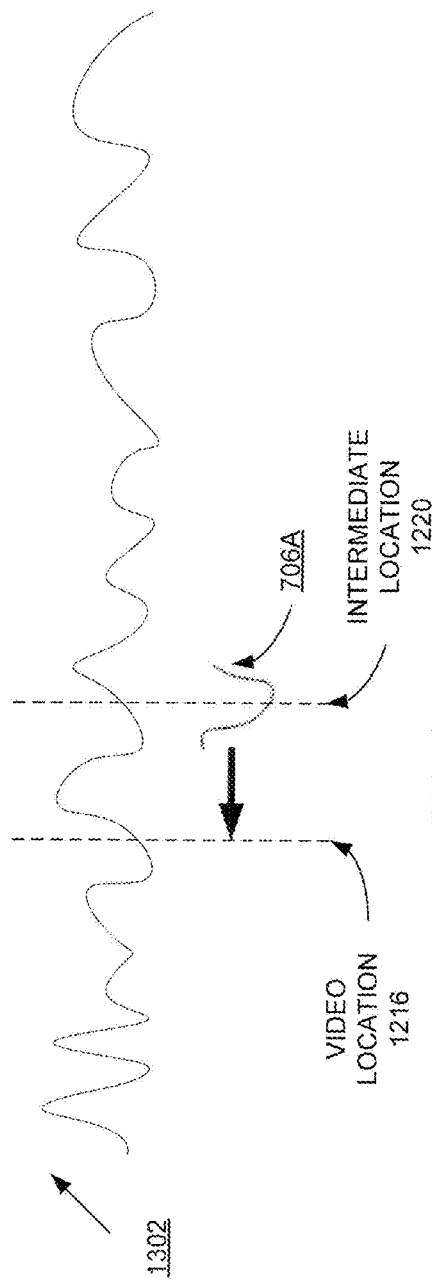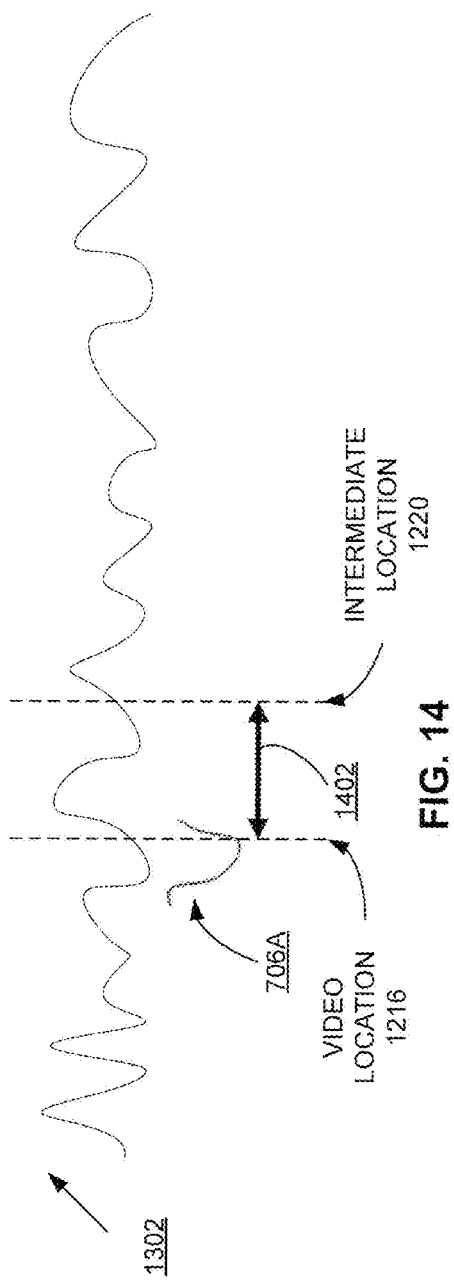

METHODS AND APPARATUS FOR IDENTIFYING SEGMENTS OF CONTENT IN A PRESENTATION STREAM USING SIGNATURE DATA

RELATED APPLICATIONS

This application claims priority to U.S. patent application Ser. No. 61/140,789, entitled "METHODS AND APPARATUS FOR IDENTIFYING SEGMENTS OF CONTENT IN A PRESENTATION STREAM USING SIGNATURE DATA", filed Dec. 24, 2008, which is hereby incorporated by reference in its entirety.

BACKGROUND

Digital video recorders (DVRS) and personal video recorders (PVRs) allow viewers to record video in a digital format to a disk drive or other type of storage medium for later playback. DVRs are often incorporated into set-top boxes for satellite and cable television services. A television program stored on a set-top box allows a viewer to perform time shifting functions, and may additionally allow a viewer to skip over commercial breaks and other portions of the recording that the viewer does not desire to watch. However, the user performs this function manually, for example, using a fast forward button of a remote control associated with the DVR. This manual fast forwarding is an inconvenience for the user. Further, manual fast forwarding by a user often leads to inaccurate results, because the user may fast forward past portions of the recording they desire to watch, or may resume playback during the portion of the recording that they want to skip over.

BRIEF DESCRIPTION OF THE DRAWINGS

The same number represents the same element or same type of element in all drawings.

FIG. 5 illustrates an embodiment of a second presentation stream in which supplemental content is presented before a selected segment.

FIG. 6 illustrates an embodiment of a second presentation stream in which supplemental content is presented after selected segments.

FIGS. 13-14 illustrate embodiments of graphical representations of a subtraction process performed to determine an offset between the video location and the intermediate location.

DETAILED DESCRIPTION OF THE DRAWINGS

Figure 1:
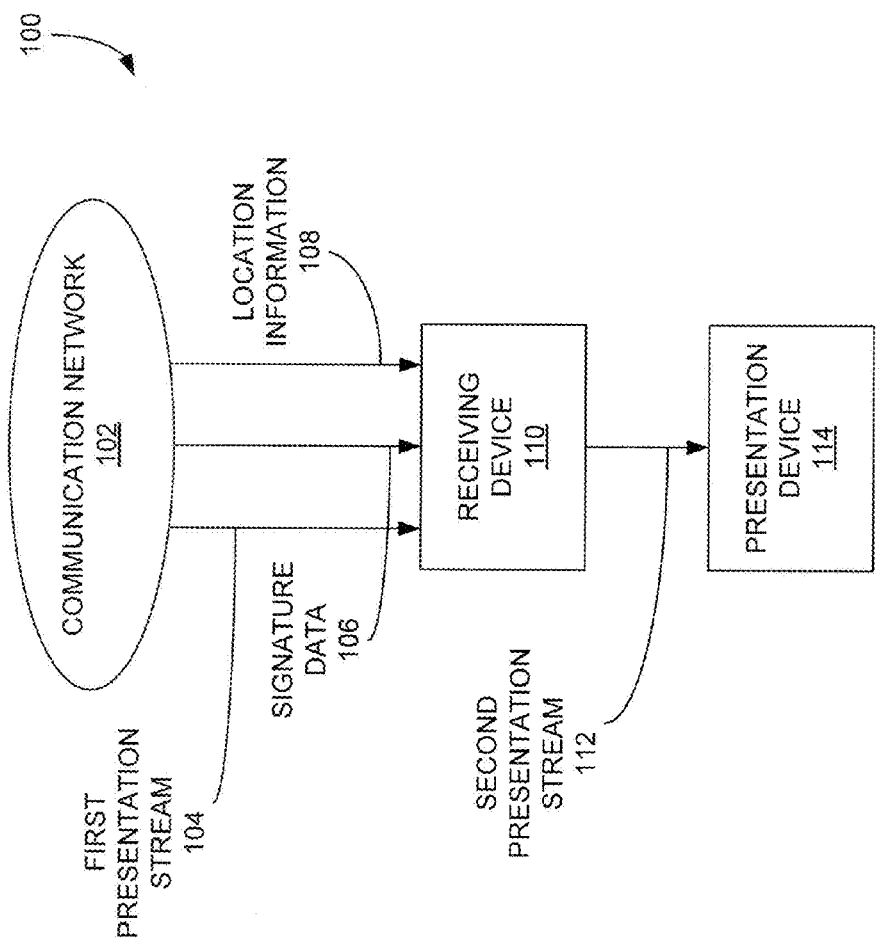
FIG. 1 illustrates an embodiment of a system for presenting content to a user.

The various embodiments described herein generally provide apparatus, systems and methods which facilitate the reception, processing, and outputting of presentation content. More particularly, the various embodiments described herein provide for the identification of locations in a presentation stream based on metadata associated with the presentation stream. Identified locations within a presentation stream may be utilized to identify boundaries of segments within the presentation stream, such as segments of a show and interstitials (e.g., commercials) of the show. In various embodiments, identified portions of a presentation stream may be utilized for skipping segments of content during presentation, insertion of supplemental or substitute content within various locations of the presentation stream, selective presentation of specific segments of the presentation stream, presentation of segments of content in non-sequential order and the like.

In at least one embodiment, the presentation stream to be received, processed, outputted and/or communicated may come in any form of presentation data, such as audio data, video data, A/V data, slide shows and the like. Further, the presentation stream may be supplied by any source.

In at least one embodiment, a receiving device receives location information referencing a location within the first presentation stream. For example, the location information may be received separately from the first presentation stream. Additionally received is a signature of a portion of a presentation stream corresponding with the location. As used herein, a signature refers to characteristics of a waveform or data that help identify an event or condition. The location information and/or the signature data may be supplied separately from the presentation stream. Further, the location information and/or the signature data may be supplied by the same source as the presentation stream or a different source as the presentation stream depending on desired design criteria.

The receiving device processes the presentation stream to locate the signature portion, and thus, the location referenced by the location information. In at least one embodiment, the receiving device identifies portions of the presentation stream based on the identified location, such as boundaries of segments of content or insertion locations of supplemental content. The receiving device may then perform further processing using the identified portions of the presentation stream, such as filtering of segments of the presentation stream.

In some embodiments, the boundaries of segments of the presentation stream may correspond with the location of the signature data. In other words, the signature data comprises a portion of the presentation stream at the boundary of the segment. In at least one embodiment, the boundaries of segments are specified relative to the location of the signature data. For example, a location of signature data may be the middle of a segment of the presentation stream and the boundaries of the segment may be specified by beginning and ending off-sets specified relative to the location of the signature data.

In at least one embodiment, identified segments may be designated for playback or skipping during presentation. For example, one or more boundaries of a portion of the presentation stream may correlate with an interstitial, e.g., commercials of a radio or television program. The receiving device may utilize the identified boundaries of the portion of the presentation to skip presentation of the interstitial during playback. Other portions of presentation content may also be skipped, such as chapters or segments of a movie, television program, radio broadcast and the like.

In at least one embodiment, interstitials and other segments of a presentation stream identified in accordance with the above may be replaced with substitute content. For example, an interstitial (e.g., a commercial) may be replaced with a more timely or relevant commercial. Similarly, a chapter or scene in a movie or television program may be replaced with an alternative chapter or scene.

In some embodiments, additional portions of content may be inserted into a presentation stream at identified locations. The insertion of content may be performed in conjunction with or independently of the filtering of other portions of the presentation stream. For example, several commercial breaks may be filtered from a presentation stream and a substitute commercial break may be inserted at another location independent of the previous commercial breaks. In one scenario, new content, such as a new scene, may be inserted into an otherwise unmodified presentation stream.

In at least one embodiment, identified segments of a presentation stream may be presented in a non-sequential order. In other words, a presentation stream may include a plurality of segments which were originally intended for presentation in a specific order. However, identified segments may be presented in a different temporal order than the original temporal order of the segments. For example, the segments of the presentation stream may be presented in reverse chronological order. Similarly, the segments may be presented in a custom order. For example, a recorded A/V stream of a news broadcast may include "top stories", "national news", "local news", "weather" and "sports" portions presented in that particular order. However, the user may desire to playback the recorded news broadcast in the following order: "sports", "weather", "top stories", "local news" and "national news". In at least one embodiment, a receiving device analyzes the presentation stream to determine the boundaries of each segment of the news broadcast. The user designates the playback order, and the receiving device presents the various segments of the presentation stream automatically in the designated order.

In at least one embodiment, a user may be presented with a menu of available segments of the television program, and may select one or more of the available segments for presentation. The receiving device may identify segments and generate a selection menu therefrom. Based upon user selection of particular segments from the selection menu, the receiving device responsively outputs the selected segments, skipping presentation of the undesignated segments. For example, a user may select particular news stories that they desire to view, and the recording device may output the selected news stories back-to-back, skipping presentation of undesignated segments interspersed therebetween.

As described above, a user may effectively view a subset of the segments of an A/V stream in the original temporal order of the segments, skipping output of undesignated segments of the A/V stream. In some embodiments, a user may designate a different presentation order for the segments of the A/V stream than the original presentation order of the segments. This allows the user to reorder the content of an A/V stream.

In some embodiments, a user may be restricted from temporally moving through particular identified segments of a presentation stream at a non-real time presentation rate of the A/V stream. In other words, a receiving device may automatically output particular segments of a presentation stream without skipping over or otherwise fast forwarding through the segments, regardless of whether a user provides input requesting fast forwarding or skipping through the segments. For example, commercials within a television program may be associated with restrictions against fast forwarding or skipping, and a recording device may automatically present the commercial segments regardless of the receipt of user input requesting non-presentation of the segments.

As described above, a presentation stream may come in any form of an A/V stream. Exemplary A/V stream formats include Motion Picture Experts Group (MPEG) standards, Flash, Windows Media and the like. It is to be appreciated that the A/V stream may be supplied by any source, such as an over-the-air broadcast, a satellite or cable television distribution system, a digital video disk (DVD) or other optical disk, the internet or other communication networks and the like.

Generally, an A/V stream is a contiguous block of associated audio and video data that may be transmitted to, and received by, an electronic device, such as a terrestrial ("over-the-air") television receiver, a cable television receiver, a satellite television receiver, an internet connected television or television receiver, a computer, a portable electronic device, or the like. In at least one embodiment, an A/V stream may include a recording of a contiguous block of programming from a television channel (e.g., an episode of a television show). For example, a DVR may record a single channel between 7:00 and 8:00, which may correspond with a single episode of a television program. Generally, an hour long recording includes approximately 42 minutes of video frames of the television program and approximately 18 minutes of video frames of commercials and other content that is not part of the television program.

The television program may be comprised of multiple segments of video frames, which are interspersed with interstitials (e.g., commercials). As used herein, interstitials are the video frames of a recording that do not belong to a selected show (e.g., commercials, promotions, alerts, and other shows). A segment of video includes contiguous video frames of the program that are between one or more interstitials.

Further, an A/V stream may be delivered by any transmission method, such as broadcast, multicast, simulcast, closed circuit, pay-per-view, point-to-point (by "streaming," file transfer, or other means), or other methods. Additionally, the A/V stream may be transmitted by way of any communication technology, such as by satellite, wire or optical cable, wireless or other means. The A/V stream may also be transferred over any type of communication network, such as the internet or other wide area network (WAN), a local area network (LAN), a private network, a mobile communication system, a terrestrial television network, a cable television network and a satellite television network. In some embodiments, content may be accessed from storage devices, such as hard drives, optical disks, portable storage mediums, e.g., USB flash drives and the like.

In some embodiments, the A/V data may be associated with supplemental data that includes text data, such as closed captioning data or subtitles. Particular portions of the closed captioning data may be associated with specified portions of the A/V data. The text data associated with an A/V stream may be processed to identify portions of the A/V stream. More particularly, the text data may be processed to identify boundaries of portions of the A/V stream. The portions of the A/V stream between identified boundaries may then be designated for presentation to a user, or may be designated for skipping during presentation of the A/V stream. Likewise, segments of the presentation stream may be replaced, new content inserted into the presentation stream, segments may be presented in a non-sequential order and the like as described above.

In at least one embodiment, the above described signature identification technique may be enhanced in combination with the aforementioned text processing technique. In other words, a receiving device may process location information that references closed captioning data associated with a video location and a signature of data corresponding with the video location to identify the video location in the presentation stream. In at least one embodiment, closed captioning data is utilized to narrow a portion of the A/V stream that is searched to identify a location corresponding with the signature data.

For example, closed captioning data may be searched to identify the vicinity of the video location in the presentation stream. In other words, the closed captioning data is searched to identify search boundaries that include the video location. The search boundaries of the presentation stream are then processed to identify the video location based on the signature data. This is useful for example when a broadcaster shifts closed captioning data by several seconds from the original presentation location of the corresponding audio data. Because the location of particular frames of video data within a segment do not typically change, the location of the signature data in the presentation stream provides a more reliable absolute location, but also utilizes relatively more computational resources. The closed captioning data search may be utilized to narrow the amount of data to be processed to identify the signature data.

FIG. 1 illustrates an embodiment of a system 100 for presenting content to a user. The system of FIG. 1 is operable for identifying locations within a contiguous block of presentation data. Additionally, the system of FIG. 1 is operable for identifying locations in a presentation stream, such as boundaries of segments of the presentation stream. For example, some segments of presentation content may be identified and filtered or replaced during presentation. In other embodiments, identified segments and locations may also be utilized for replacement of specific segments, insertion of supplemental or substitute segments into the presentation stream, presentation of the segments of the presentation stream in non-sequential order, generation of a menu of available segments for presentation and the like. Still further, in at least one embodiment, specific segments may be identified and associated with particular playback restrictions. For example, a user may be restricted from fast-forwarding through particular portions of the presentation stream.

FIG. 1 will be described initially in reference to filtering of segments of presentation content and the other applications of the identification process will be described in further detail below. The system 100 includes a communication network 102, a receiving device 110 and a presentation device 114. Each of these components is discussed in greater detail below. FIG. 1 may include other devices, components or elements not illustrated for the sake of brevity.

The communication network 102 may be any communication network capable of transmitting a presentation stream. Exemplary communication networks include television distribution networks (e.g., over-the-air (OTA), satellite and cable television networks), radio broadcast networks, wireless communication networks, public switched telephone networks (PSTN), LANs and WANs providing data communication services. The communication network 102 may utilize any desired combination of wired (e.g., cable and fiber) and/or wireless (e.g., cellular, satellite, microwave and radio frequency) communication mediums and any desired network topology (or topologies when multiple mediums are utilized).

The receiving device 110 of FIG. 1 may be any device capable of receiving a presentation stream from the communication network 102. In at least one embodiment, the communication network 102 comprises a cable or satellite television network for distribution of an A/V stream and the receiving device 110 comprises a set-top box configured to communicate with the communication network 102. In at least one embodiment, the receiving device 110 comprises a DVR. In another example, the receiving device 110 may be computer, a personal digital assistant (PDA) or similar device configured to communicate with the internet or comparable communication network 102 to receive and present A/V content. In at least one embodiment, the receiving device 110 comprises a radio that receives audio content, via broadcast, multi-cast or uni-cast, from the communication network 102. While the receiving device 110 is illustrated as receiving content via the communication network 102, in other embodiments, the receiving device may receive, capture, record, access and/or process presentation streams from non-broadcast services, such as optical disks, local storage devices (e.g., hard drives or flash memory), video recorders, DVD players, personal computers or the internet.

The presentation device 114 may be any device configured to receive a presentation stream from the receiving device 110 and present the presentation stream to a user. Examples of the presentation device 114 include a television, a video monitor or similar device capable of presenting audio and/or video information to a user, a stereo or audio receiver, a projector and the like. The receiving device 110 may be communicatively coupled to the presentation device 114 through any type of wired or wireless connection. Exemplary wired connections include coax, fiber, composite video and high-definition multimedia interface (HDMI). Exemplary wireless connections include WiFi, ultra-wide band (UWB) and Bluetooth. In some implementations, the presentation device 114 may be integrated within the receiving device 110. For example, each of a computer, a television, a stereo with an integrated radio receiver, a PDA and a mobile communication device may serve as both the receiving device 110 and the presentation device 114 by providing the capability of receiving presentation streams from the communication network 102 and presenting the received presentation streams to a user.

In the system 100, the communication network 102 transmits each of a first presentation stream 104, signature data 106 and location information 108 to the receiving device 110. In at least one embodiment, the first presentation stream 104 comprises video data, such as a series of digital frames or single images to be presented in a serial fashion to a user. In another embodiment, the first presentation stream 104 comprises audio data, such as a series of audio samples to be presented to the user. In some embodiments, the first presentation stream 104 comprises A/V data, including a combination of the aforementioned audio data and video data that are presented simultaneously to the user. In one example, the A/V data may be formatted according to one of the MPEG encoding standards, such as MPEG-2 or MPEG-4, as may be used in DBS systems, terrestrial Advanced Television Systems Committee (ATSC) systems or cable systems. However, different audio and video data formats may be utilized in other implementations.

The communication network 102 also transmits signature data 106 and location information 108 to the receiving device 110. The signature data 106 and/or the location information 108 may be transmitted to the receiving device 110 together or separately. Further, the signature data 106 and/or the location information 108 may be transmitted to the receiving device 110 together or separately from the first presentation stream 104. Generally, the signature data 106 includes a sample of data included within the first presentation stream 104 that is utilized to identify a location within the first presentation stream 104. The location within the first presentation stream 104 is identified by searching for the signature data 106 in the first presentation stream 104.

The location information 108 specifies information regarding the location associated with the signature data 106. In at least one embodiment, the location information 108 specifies portions of the first presentation stream 104 that are to be skipped and/or presented during presentation of the A/V data of the first presentation stream 104 by the receiving device 110. For example, if the first presentation stream 104 includes one or more segments of a television show interspersed with one or more interstitials, then the location information 108 may identify the locations of the segments, which are to be presented, and/or identify the locations of the interstitial, which are to be skipped.

Boundaries of segments in the first presentation stream 104 may either correspond with locations specified by the signature data 106 or may be identified by off-sets specified relative to a location corresponding with the signature data 106. For example, a location specified by the signature data 106 may be the middle of a particular segment of presentation content and beginning and ending off-sets may specify the boundaries of the associated segment of the first presentation stream 104. In at least one embodiment, the identification process is utilized to identify interstitials within a first presentation stream 104 that are to be skipped. The location information 108 may identify the boundaries of either the segments or the interstitials depending on desired design criteria. Generally, the beginning boundary of a segment corresponds with the ending boundary of an interstitial. Similarly, the ending boundary of a segment corresponds with the beginning boundary of an interstitial. Thus, the receiving device 110 may utilize the boundaries of segments to identify the boundaries of the interstitials, and vice versa. In some embodiments, the first presentation stream 104 may not include both segments and interstitials, but nonetheless may include portions of content that a user desires to skip during presentation of the first presentation stream 104. Thus, the location information 108 may identify which portions of the content of the first presentation stream 104 are to be presented and/or skipped during presentation to a user.

Figure 2:
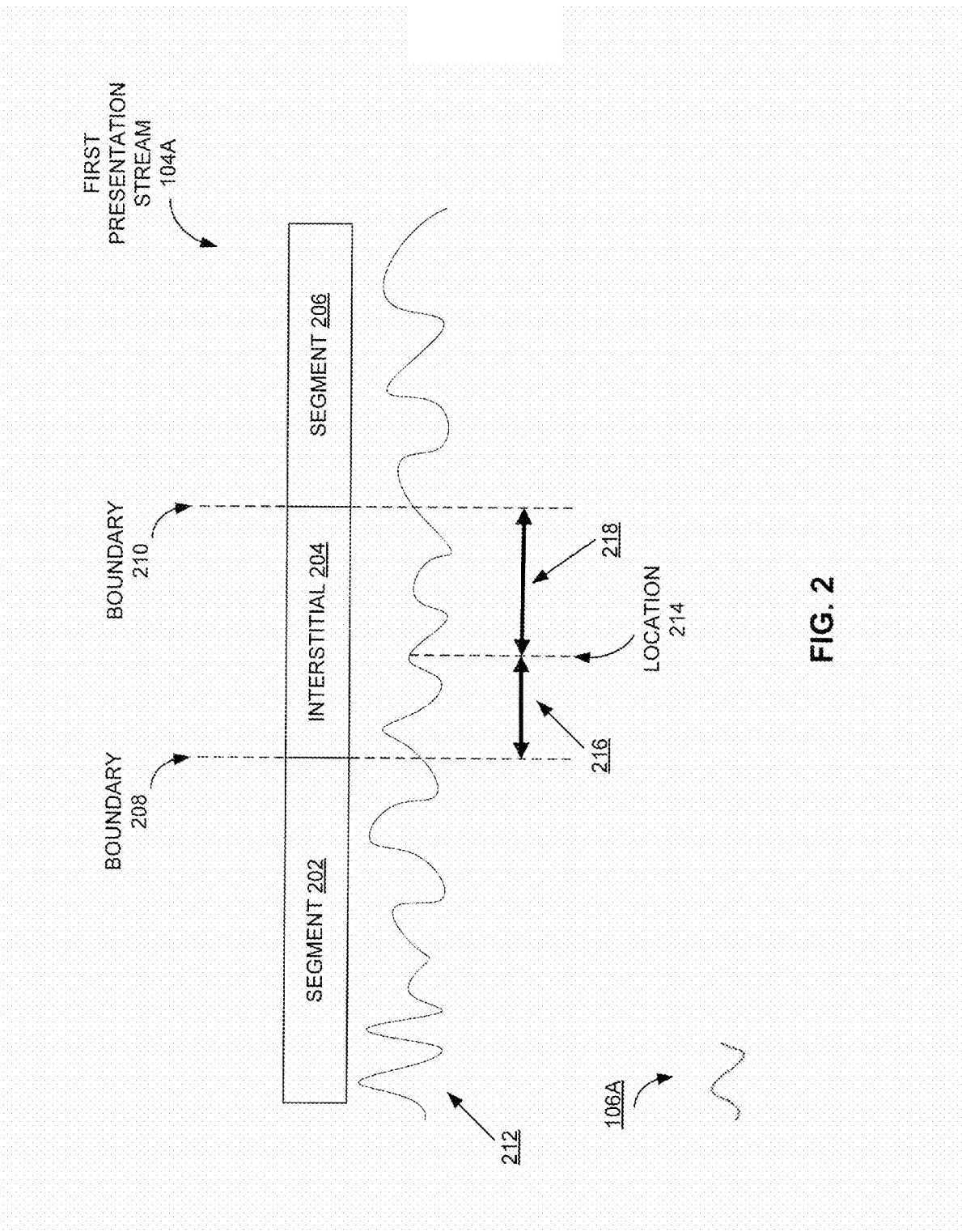
FIG. 2 illustrates an embodiment of a graphical representation of a first presentation stream received by the receiving device.

In at least one embodiment, the signature data 106 comprises a portion of audio data of the first presentation stream 104. For example, the first presentation stream 104 may comprise either an audio file (e.g., an MP3 audio file) or an A/V stream including audio data. The signature data 106 may then comprise a sample of a portion of the audio data. FIG. 2 illustrates an embodiment of a graphical representation of a first presentation stream received by the receiving device 10. FIG. 2 will be discussed in reference to the system 100 of FIG. 1.

The first presentation stream 104A includes a first segment 202 of content, an interstitial 204 and a second segment 206 of content. Also indicated are beginning and ending boundaries 208 and 210 of the interstitial 204, which are indicated to the receiving device 110 (see FIG. 1) by way of the location information 108. It is to be recognized that the boundaries 208 and 210 of the interstitial 204 are also boundaries of the segments 202 and 206. Also illustrated in FIG. 2 is a waveform 212 of the audio data corresponding with the first presentation stream 104A.

The signature data 106A illustrated in FIG. 2 corresponds with a portion of the waveform 212. The receiving device 110 processes the waveform 212 to identify the location 214 corresponding with the signature data 106A. In at least one embodiment, the location 214 may be identified by processing samples of the output signal for the audio data. In at least one embodiment, the location 214 may be identified based on an output power of the audio data of the first presentation stream 104A. For example, samples of specific durations of audio data may be computed to identify the location 214 corresponding with the signature data 106A.

In the illustrated example, the location 214 corresponding with the signature data 106A is in the middle of the interstitial 204. Thus, the receiving device 110 may utilize offsets 216 and 218 to identify the boundaries of the interstitial 204 (as well as the boundaries of the segments 202 and 206). In some embodiments, the signature data 106A and the location 214 may correspond with one of the boundaries 208 or 210 such that the offsets 216 and 218 are not utilized.

Figure 3:
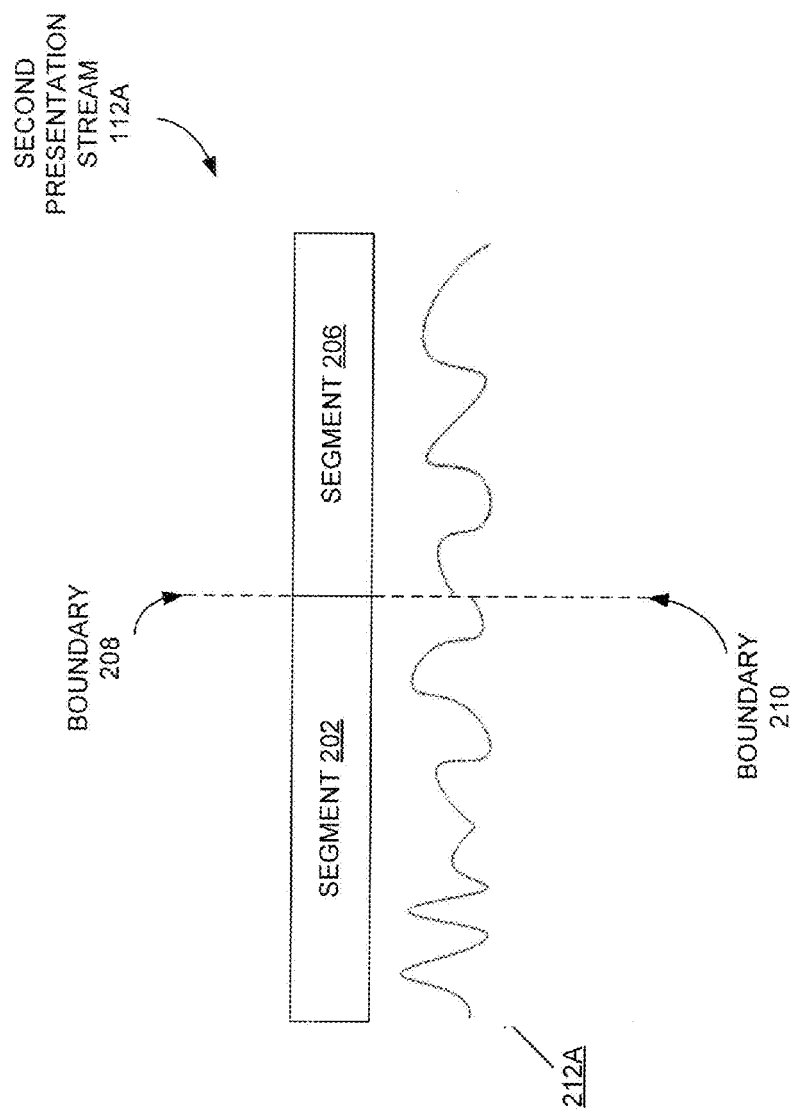
FIG. 3 illustrates an embodiment of a second presentation stream outputted by the receiving device of FIG. 1.

Responsive to identifying the boundaries, the receiving device 110 may filter the interstitial 204 during output of the content. FIG. 3 illustrates an embodiment of a second presentation stream outputted by the receiving device 110 of FIG. 1. As illustrated in FIG. 3, the receiving device 110 filters the interstitial 204 from the second presentation stream 112A. Thus, the segment 206 follows the segment 202 during output of the second presentation stream 104A. Similarly, the boundary 208 and the boundary 210 map to the second location in the second presentation stream 104A. Also illustrated in FIG. 3 is the modified waveform 212A after filtering of the interstitial 204 from the second presentation stream 104A.

In at least one embodiment, the signature data 106 comprises compressed data, e.g., compressed audio or video data. The compressed data may then be expanded and compared with the audio or video data of the first presentation stream 104 which has also been uncompressed. In some embodiments, the signature data 106 may be compared with the data of the first presentation stream 104 in compressed format, e.g., before either data has been expanded.

Figure 4:
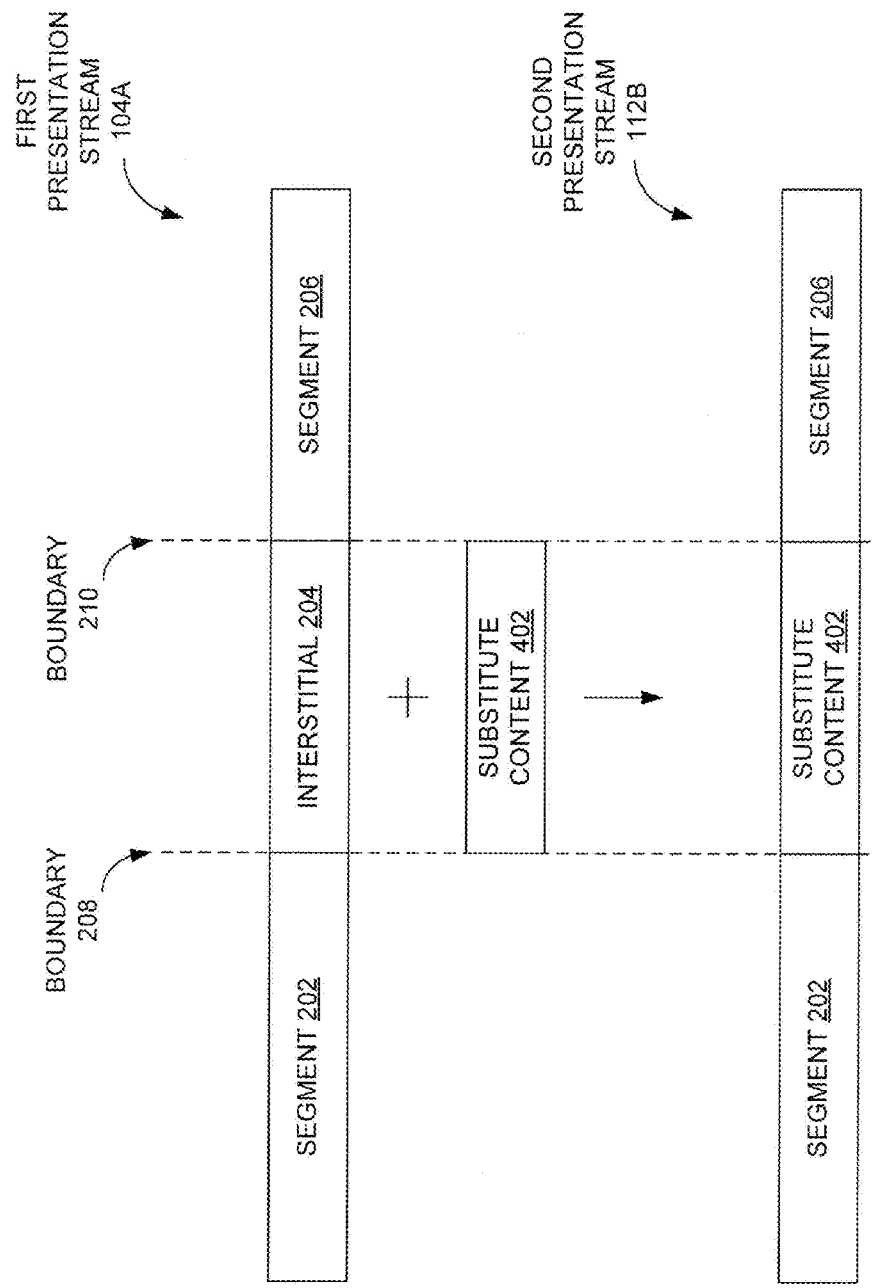
FIG. 4 illustrates an embodiment of a graphical representation of a first audio/video (A/V) stream received by the receiving device of FIG. 1 and a second A/V stream outputted by the receiving device.

In at least one embodiment, an interstitial 204, or other content of a presentation stream, may be replaced with substitute content rather than being filtered from the presentation stream. FIG. 4 illustrates an embodiment of a graphical representation of the first A/V stream received by the receiving device 110 of FIG. 1, and a second A/V stream outputted by the receiving device 110. More particularly, FIG. 4 illustrates an embodiment in which an interstitial of a first presentation stream 104A is replaced by the substitute content 402 during presentation of a second presentation stream 112B. FIG. 4 will be discussed in reference to the system 100 of FIG. 1.

In at least one embodiment, the location of the interstitial 204 is identified in accordance with the processing discussed in reference to FIG. 2. Additionally, the receiving device 110 identifies substitute content 402 for insertion into a second presentation stream 112B. In at least one embodiment, the substitute content 402 is specified by the location information 108. In other words, the location information 108 may specify the information comprising the substitute content 402.

In the specific example of FIG. 2 the boundary 208 (e.g., the ending boundary of segment 202) is the starting point at which the substitute content 402 is to replace a portion of the first presentation stream 104A. Likewise, the boundary 210 (e.g., the beginning boundary of segment 206) is the ending point at which the substitute content 402 is to replace a portion of the first presentation stream 104. In FIG. 4, the portion of the first presentation stream 104A to be replaced is the interstitial 204, located between the segments 202 and 206. As a result of this replacement, a second presentation stream 112B is produced, in which the substitute content 402 is presented in place of the interstitial 204 during presentation of the second presentation stream 112B. The substitute content 302 may be the same size as the interstitial 204, longer in length than the interstitial 204 or shorter in length than the interstitial 204 depending on desired design criteria.

While FIG. 4 illustrates the substitute content 402 replacing the interstitial 204, it is to be appreciated that other locations for the substitute content 402 may also be utilized. FIG. 5 illustrates an embodiment of a second presentation stream 112C in which the supplemental content 502 is presented before the segments 202 and 206. Thus, the second presentation stream 112B includes the supplemental content 502 followed by the segment 202 and the segment 206. The interstitial 204 (see FIG. 2) is thus skipped during presentation of the second presentation stream 112C.

FIG. 6 illustrates an embodiment of a second presentation stream 112D in which the supplemental content 602 is presented after the segments 202 and 206. The second presentation stream 112D includes the segment 202 followed by the segment 206 which is followed by the supplemental content 602. Again, the interstitial 204 (see FIG. 2) is skipped during presentation of the second presentation stream 112D. The supplemental content 602 may be inserted at any logical location within the second presentation stream 112D.

While the supplemental content 602 is illustrated as having the same length as the interstitial 204, it is to be appreciated that the supplemental content 602 may have a duration that is the same as, or different than the original content it replaces (e.g., interstitial 204). For example, the length of substitute or supplemental commercials utilized during playback of the recording may be selected to maintain the original length of the recording. In another embodiment, the length of the supplemental content 602 utilized may be significantly shorter or longer than the commercials or other content it replaces. For example, an interstitial may originally include four commercials totaling two minutes in length, and these four commercials may be replaced with a single commercial that is thirty seconds in length. In at least one embodiment, the receiving device 110 may restrict the user from utilizing trick mode functions (e.g., fast forwarding) in order to skip over the supplemental content 602.

The supplemental content 602 may be shown to the user to offset the costs associated with removing the original interstitials 204. Thus, by watching a substitute commercial, the user is able to avoid watching an additional 1.5 minutes of commercials that were originally in the show. In at least one embodiment, the supplemental content 602 may also be selected to replace a commercial with a timelier commercial from the same advertiser. For example, a department store may have originally advertised a sale during the original broadcast of the show, but that particular sale may have since ended. Thus, the supplemental content 602 may replace that particular commercial with another commercial advertising a current sale at the store.

In at least one embodiment, the supplemental or substitute content may be selected based on characteristics or demographics of the user. For example, if the user is a small child, then a commercial for a toy may be selected, whereas if the viewer is an adult male, then a commercial for a sports car may be shown. In some embodiments, the characteristics utilized may be viewing characteristics of the user. Thus, the receiving device 110 may track what the user watches, and the supplemental content 602 may be selected based on the collected data. For example, if the user watches many detective shows, then the supplemental or substitute content may be a preview for a new detective show on Friday nights, whereas, if the user watches many reality shows, then the supplemental or substitute content may be a preview for the new season of a reality show on Thursday nights.

Referring back to FIG. 1, the receiving device 110 may also identify locations within a first presentation stream 104 based on analyzation of video data. In at least one embodiment, the receiving device processes luminance values of video data to identify locations within a first presentation stream 104. For example, the receiving device 110 may compute the average luminance value for each frame of video data for the first presentation stream 104. The average luminance value may be computed for an entire frame or some subset thereof.

After computing the average luminance values for frames, the receiving device 110 processes the average luminance values for the plurality of frames to locate a particular frame having an average luminance value as specified by the signature data 106. An identified frame corresponds with an identified location as specified by the location data. Boundaries of segments of the first presentation stream 104A may then be determined based on the location and/or other data, such as offset values. For example, offset values may identify boundaries of segments corresponding with an identified video location.

In some embodiments, the processing of the video data performed by the receiving device 110 may identify frames having an average luminance value within a specified tolerance of a value specified by the signature data 106. This allows the system 100 to account for situations where the video data received by each receiving device 110 is not the same. For example, video data may be damaged during transmission, local affiliates may insert different channel logos onto a television program and television programs may include weather alerts or other scrolling information.

In at least one embodiment, the receiving device 110 may identify locations in a presentation stream based on average luminance value transitions rather than identifying absolute average luminance values. For example, the signature data 106 may specify a transition from a first luminance value to a second luminance value within the presentation stream. The transition may be specified in absolute or relative terms. The receiving device 110 computes the average luminance values for the frames of the first presentation stream 104 and then processes the average luminance values to identify a location within the first presentation stream 104A. Table #1 illustrates an embodiment of average luminance values for a plurality of frames of the first presentation stream 104.

TABLE #1

Average luminance values

| Frame | Luminance value |
|---|---|
| 1 | 55% |
| 2 | 53% |
| 3 | 50% |
| 4 | 51% |
| 5 | 98% |
| 6 | 76% |
| 7 | 75% |
| 8 | 78% |

Take for example the situation where the signature data 106 specifies an average luminance value transition from 50% to 100% and a tolerance of ±5%. The receiving device processes the data in Table #1 to identify the transition from frame 4 to frame 5 as matching the criteria of the signature data 106. As such, the receiving device 110 identifies frame #5 as the video location specified by the location information 108. The receiving device 110 may then identify boundaries of segments using off-sets in accordance with the teachings above to filter content during output of the second presentation stream 112 or insert content into the second presentation stream 112.

Depending on the resiliency and other characteristics of the first presentation stream, the node of the communication network 102 generating and transmitting the location information 108 and the signature data 106 may issue more than one instance of the location information 108 and the signature data 106 to the receiving device 110. Each transmitted set of signature data 106 may be associated with a particular set of location information 108. Further, each set of signature data 106 may point to a particular location within the first presentation stream 104. Each set of location information 108 may include different off-set values specified relative to the associated signature data 106. Thus, the receiving device 110 may locate the boundaries of a particular segment of the first presentation stream 104 based on identifying multiple locations within the first presentation stream 104. Each set of location information 108 and signature data 106 may be issued separately, or may be transmitted in one more other sets.

In accordance with another embodiment, locations and segments of a presentation stream may be identified by processing supplement content, such as text data, associated with the presentation stream. For example, closed captioning data associated with an A/V stream may be processed to identify locations within the A/V stream.

Figure 7:
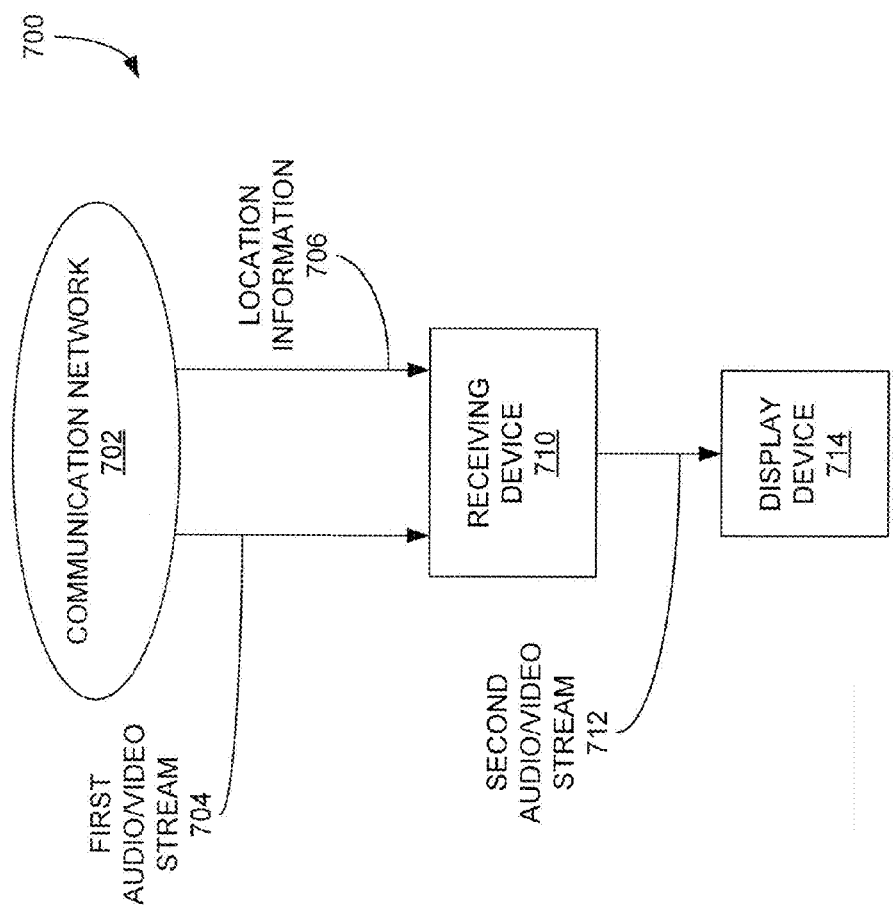
FIG. 7 illustrates an embodiment of a system for presenting content to a user.

FIG. 7 illustrates an embodiment of a system 700 for presenting content to a user. The system of FIG. 7 is operable for filtering A/V content from a contiguous block of A/V data. The system 700 includes a communication network 702, a receiving device 710 and a display device 714. Each of these components is discussed in greater detail below. The system 700 of FIG. 7 may include other devices, components or elements not illustrated for the sake of brevity.

The communication network 702 may be any communication network capable of transmitting an A/V stream to a receiving device 110. The communication network 702 may be similar to the communication network 102 of FIG. 1. The receiving device 710 of FIG. 7 may be any device capable of receiving an A/V stream from the communication network 702 and outputting the A/V stream for presentation by a display device 714. The receiving device 710 may be similar to the receiving device 110, with additional hardware, software or control logic provided to identify locations within an A/V stream as described below. The display device 714 may be any device configured to receive an A/V stream from the receiving device 710 and present the A/V stream to a user. The display device 714 may be similar to the presentation device 114 described above. Further discussion of the communication network 702, the receiving device 710 and the display device 714 is omitted herein for the sake of brevity.

In the system 700, the communication network 702 transmits a first A/V stream 704 and location information 706 to the receiving device 710. Also associated with the first A/V stream 704 is supplemental data providing information relevant to the audio data and/or the video data of the first A/V stream 704. In one implementation, the supplemental data includes text data, such as closed captioning data, available for visual presentation to a user during the presentation of the associated audio and video data of the first A/V stream 704. In some embodiments, the text data may be embedded within the first A/V stream 704 during transmission across the communication network 702 to the receiving device 710. In one example, the text data may conform to any text data or closed captioning standard, such as the Electronic Industries Alliance 708 (EIA-708) standard employed in ATSC transmissions or the EIA-608 standard. When the text data is available to the display device 714, the user may configure the display device 714 to present the text data to the user in conjunction with the video data.

Each of a number of portions of the text data may be associated with a corresponding portion of the audio data or video data also included in the A/V stream 704. For example, one or more frames of the video data of the A/V stream 704 may be specifically identified with a segment of the text data included in the first A/V stream 704. A segment of text data (e.g., a string of bytes) may include displayable text strings as well as non-displayable data strings (e.g., codes utilized for positioning the text data). As a result, multiple temporal locations within the A/V stream 704 may be identified by way of an associated portion of the text data. For example, a particular text string or phrase within the text data may be associated with one or more specific frames of the video data within the first A/V stream 704 so that the text string is presented to the user simultaneously with its associated video data frames. Therefore, the particular text string or phrase may provide an indication of a location of these video frames, as well as the portion of the audio data synchronized or associated with the frames.

The communication network 702 also transmits location information 706 to the receiving device 710. The location information 706 may be transmitted to the receiving device 710 together or separately from the first A/V stream 704. The location information 706 specifies locations within the first A/V stream 704 that are to be skipped and/or presented during presentation of the A/V data of the first A/V stream 704 by the receiving device 710. For example, if the first A/V stream 704 includes one or more segments of a television show interspersed with one or more interstitials, then the location information 706 may identify the locations of the segments, which are to be presented, and/or identify the locations of the interstitial, which are to be skipped.

The receiving device 710 is operable for processing the text data to identify the portions of the A/V stream which are to be presented to a user. More particularly, the receiving device 710 operates to identify the segments of the A/V stream 704 which are to be presented to a user. The receiving device 710 outputs a second A/V stream 712 that includes the segments identified for presentation and omits the segments identified for filtering during presentation by the display device 714.

Figure 8:
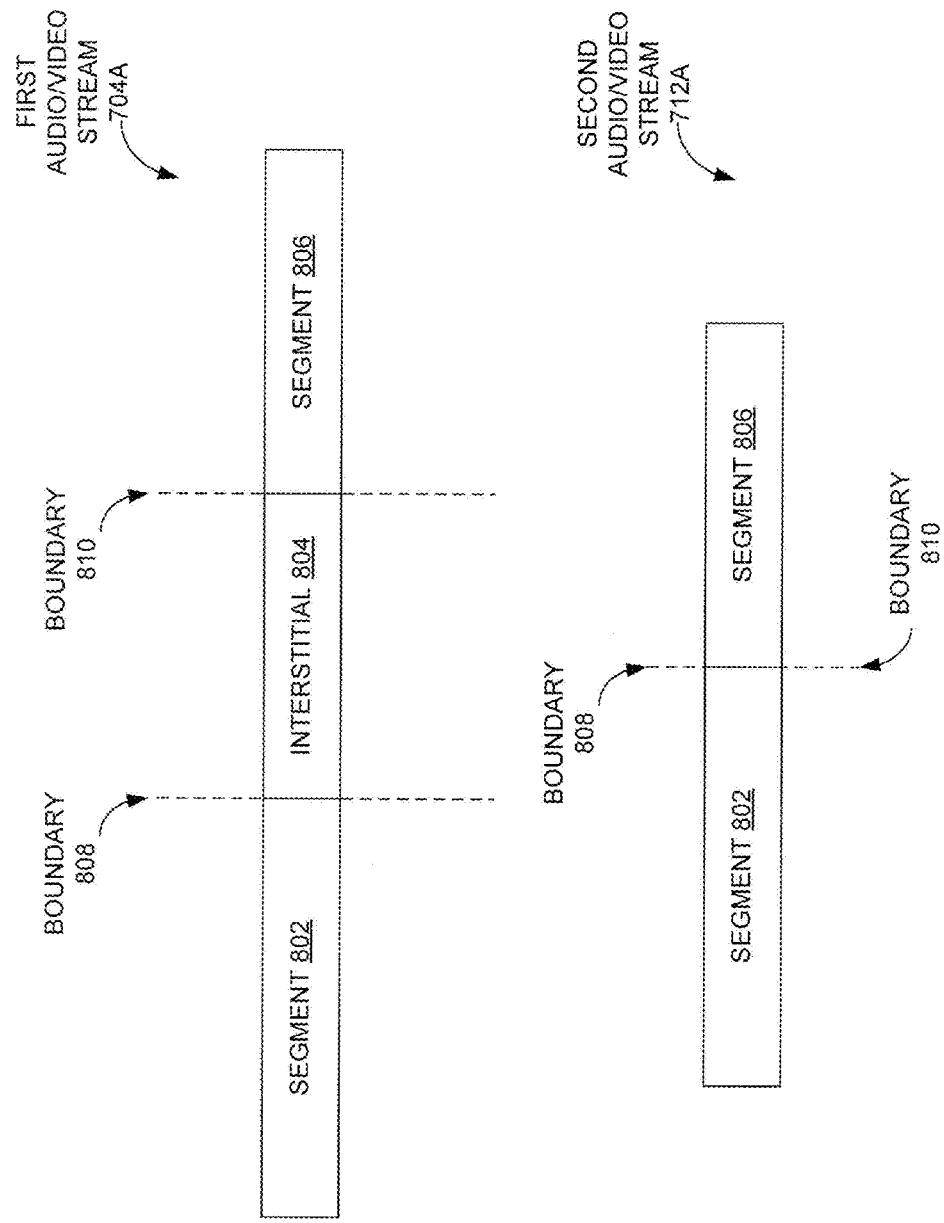
FIG. 8 illustrates an embodiment of a graphical representation of the first A/V stream received by the receiving device and a second A/V stream outputted by the receiving device.

FIG. 8 illustrates an embodiment of a graphical representation of the first A/V stream 704A received by the receiving device 710, and a second A/V stream 712A outputted by the receiving device 710. More particularly, FIG. 8 illustrates an embodiment in which an interstitial is filtered from the first A/V stream 704A during presentation of the second A/V stream 712A. FIG. 8 will be discussed in reference to the system 700 of FIG. 7.

The first A/V stream 704 includes a first A/V segment 802 of a show, an interstitial 804 and a second A/V segment 806 of the show. Also indicated are beginning and ending boundaries 808 and 810 of the interstitial 804, which are indicated to the receiving device 710 (see FIG. 7) by way of the location information 706. It is to be recognized that the boundaries 808 and 810 of the interstitial 804 are also boundaries of the segments 802 and 806. The supplemental data of the A/V stream 704A is not shown in FIG. 8 to simplify the diagram.

In the specific example of FIG. 8 the boundary 808 (e.g., the ending boundary of segment 802) is the starting point at which the interstitial 804 is to be filtered from the first A/V stream 704A. Likewise, the boundary 810 (e.g., the beginning boundary of segment 806) is the ending point at which the interstitial 804 is to be filtered from the first A/V stream 704A. As a result of the filtering, a second A/V stream 712A is produced, in which the second segment 806 is outputted immediately following the first segment 802.

The boundaries 808 and 810 are identified based on the location of one or more video locations within the first A/V stream 704A. More particularly, the beginning and ending boundaries of a segment (or interstitial) of the first A/V stream 704A may be specified by a single video location within the segment. Thus, each segment may be identified by a unique video location within the first A/V stream 704A.

To specify a video location within the first A/V stream 704A, the location information 706 references a portion of the text data associated with the first A/V stream 704A. A video location within the first A/V stream 704A may be identified by a substantially unique text string within the text data that may be unambiguously detected by the receiving device 710. The text data may consist of a single character, several characters, an entire word, multiple consecutive words, or the like. Thus, the receiving device 710 may review the text data to identify the location of the unique text string. Because the text string in the text data is associated with a particular location within the first A/V stream 704A, the location of the text string may be referenced to locate the video location within the first A/V location.

In some embodiments, multiple video locations may be utilized to specify the beginning and ending boundaries of a segment. In at least one embodiment, a single video location is utilized to identify the beginning and ending boundaries of a segment. The video location may be located at any point within the segment, and offsets may be utilized to specify the beginning and ending boundaries of the segment relative to the video location. In one implementation, a human operator, of a content provider of the first A/V stream 704A, bears responsibility for selecting the text string, the video location and/or the offsets. In other examples, the text string, video location and offset selection occurs automatically under computer control, or by way of human-computer interaction. A node within the communication network 702 may then transmit the selected text string to the receiving device 710 as the location information 706, along with the forward and backward offset data.

Figure 9:
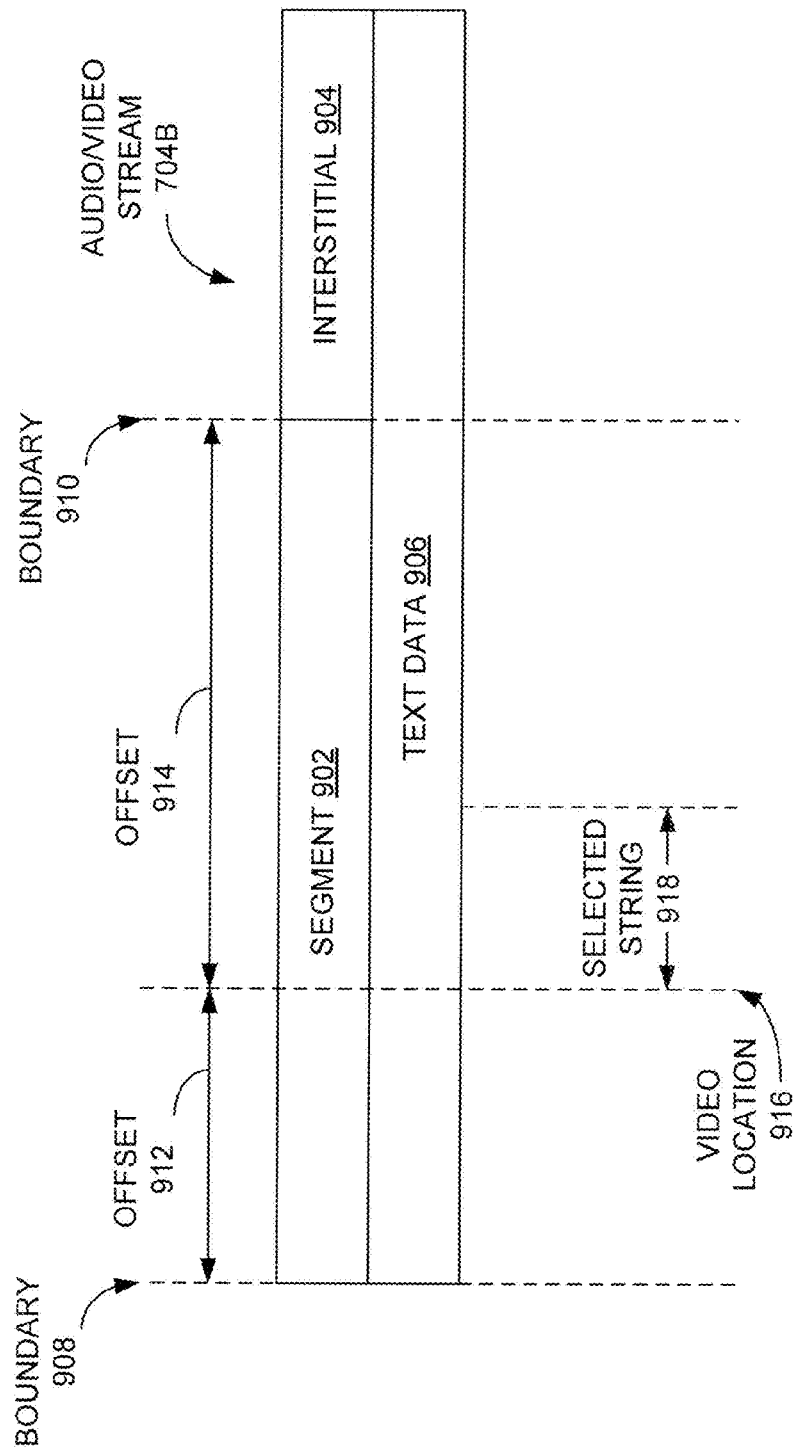
FIG. 9 illustrates an embodiment in which the boundaries of a segment of an A/V stream are identified based on a text string included within the text data associated with the A/V stream.

FIG. 9 illustrates an embodiment in which the boundaries of a segment of an A/V stream 704B are identified based on a text string included within the text data associated with the A/V stream 704B. FIG. 9 will be discussed in reference to system 700 of FIG. 7. The A/V stream 704B includes a segment 902, an interstitial 904 and text data 906. The segment 902 is defined by a boundary 908 and a boundary 910. The location information 706 received by the receiving device 710 identifies the segment 902 using a selected string 918 and offsets 912 and 914. Each of these components is discussed in greater detail below.

The receiving device 710 reviews the text data 906 to locate the selected string 918. As illustrated in FIG. 9, the selected string 918 is located at the video location 916. More particularly, in at least one embodiment, the beginning of the selected string 918 corresponds with the frame located at the video location 916. After locating the video location 916, the receiving device 710 utilizes the negative offset 912 to identify the beginning boundary 908. Likewise, the receiving device 710 utilizes the positive offset 914 to identify the ending boundaries 910. The offsets 912 and 914 are specified relative to the video location 916 to provide independence from the absolute presentation times of the video frames associated with the boundaries 908 and 910 within the A/V stream 704B. For example, two users may begin recording a particular program from two different affiliates (e.g., one channel in New York City and another channel in Atlanta). Thus, the absolute presentation time of the boundaries 908 and 910 will vary within the recordings. The technique described herein locates the same video frames associated with the boundaries 908 and 910 regardless of their absolute presentation times within a recording.

In at least one embodiment, the receiving device 710 filters the content of the A/V stream 704B by outputting the video content of segment 902, while omitting from the presentation the interstitial 904 located outside of the boundaries 908 and 910. In some embodiments, the receiving device 710 may output the video content within the boundaries 908 and 910 and may also present video content within another set of similar boundaries 908 and 910, thus omitting presentation of the interstitial 904.

In at least one embodiment, a receiving device 710 identifies a set of boundaries 908 and 910 for a portion of the A/V stream 704, and omits presentation of the content within the boundaries while presenting the other video content that is outside of the boundaries 908 and 910. For example, a user may watch the commercials within a football game, while skipping over the actual video content of the football game.

Depending on the resiliency and other characteristics of the text data, the node of the communication network 702 generating and transmitting the location information 706 may issue more than one instance of the location information 706 to the receiving device 710. For example, text data, such as closed captioning data, is often error-prone due to transmission errors and the like. As a result, the receiving device 710 may not be able to detect some of the text data, including the text data selected for specifying the video location 916. To address this issue, multiple unique text strings may be selected from the text data 906 of the A/V stream 704B to indicate multiple video locations (e.g., multiple video locations 916), each having a different location in the A/V stream 704B. Each string has differing offsets relative to the associated video location that point to the same boundaries 908 and 910. The use of multiple text strings (each accompanied with its own offset(s)) may thus result in multiple sets of location information 706 transmitted over the communication network 702 to the receiving device 710, each of which is associated with the segment 902. Each set of location information 706 may be issued separately, or may be transmitted in one more other sets.

Figure 10:
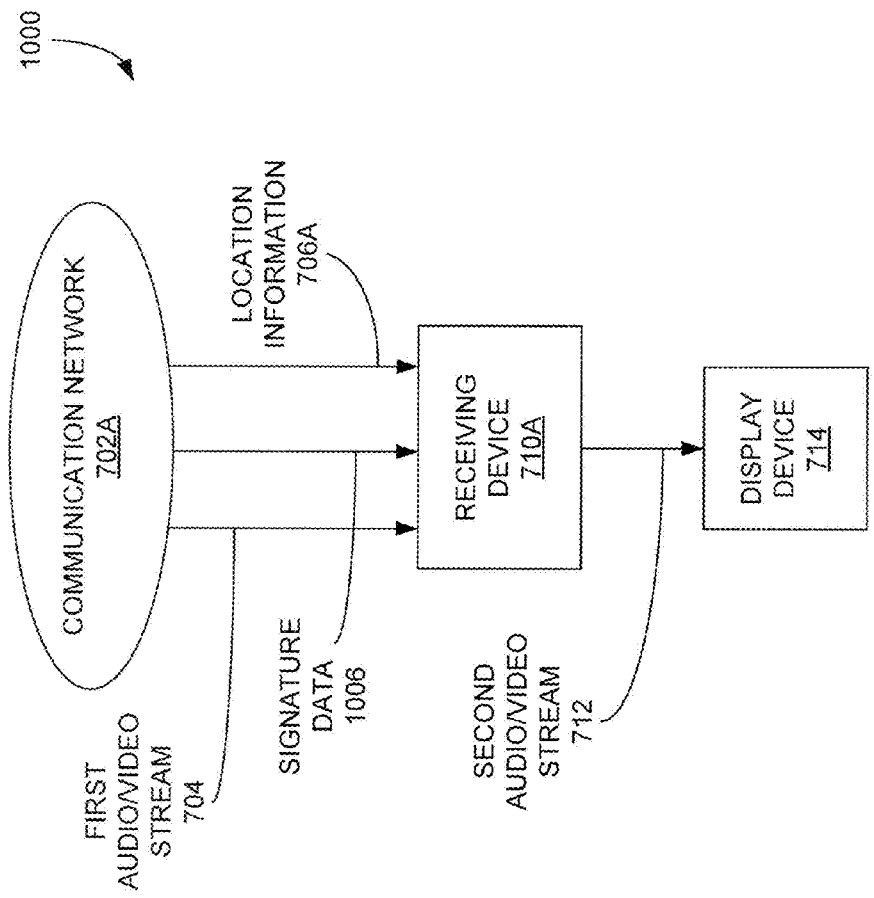
FIG. 10 illustrates an embodiment of a system for presenting content to a user.

Described above are two techniques for identifying locations within presentation stream. The two techniques may be utilized together to enhance the location identification process performed by a receiving device. FIG. 10 illustrates an embodiment of a system 1000 for presenting content to a user. The system of FIG. 7 is operable for filtering A/V content from a contiguous block of A/V data. The system 1000 includes a communication network 702A, a receiving device 710A and a display device 714. Each of these components is discussed in greater detail below. The system 1000 of FIG. 10 may include other devices, components or elements not illustrated for the sake of brevity. Discussion of components common to FIG. 7 is omitted herein for the sake of brevity.

The receiving device 710A is operable to receive a first A/V stream 704, signature data 1006 and location information 706A. The signature data 1006 may be similar to the signature data 106 of FIG. 1. The location information 706A references closed captioning data to identify a video location within the first A/V stream 704. Additionally, the location information includes at least one off-set specified relative to the video location. The receiving device 710A is operable to identify portions of the A/V stream 704 based on the signature data 1006 and the location information 706A. Responsive to identifying portions of the first A/V stream 704, the receiving device 710 filters particular portions from the first A/V stream 704 to output a second A/V stream 712 for presentation by the display device 714.

In at least one embodiment, the receiving device 710A processes closed captioning data associated with the first A/V stream 704 to narrow the amount of data to be processed using the signature data 1006. The first A/V stream 704 is processed to identify a video location within the first A/V stream 704 using the signature data 1006. Based upon the video location, boundaries of one or more segments of the first A/V stream 704 may be located using off-set data specified by the location information 706.

Figure 11:
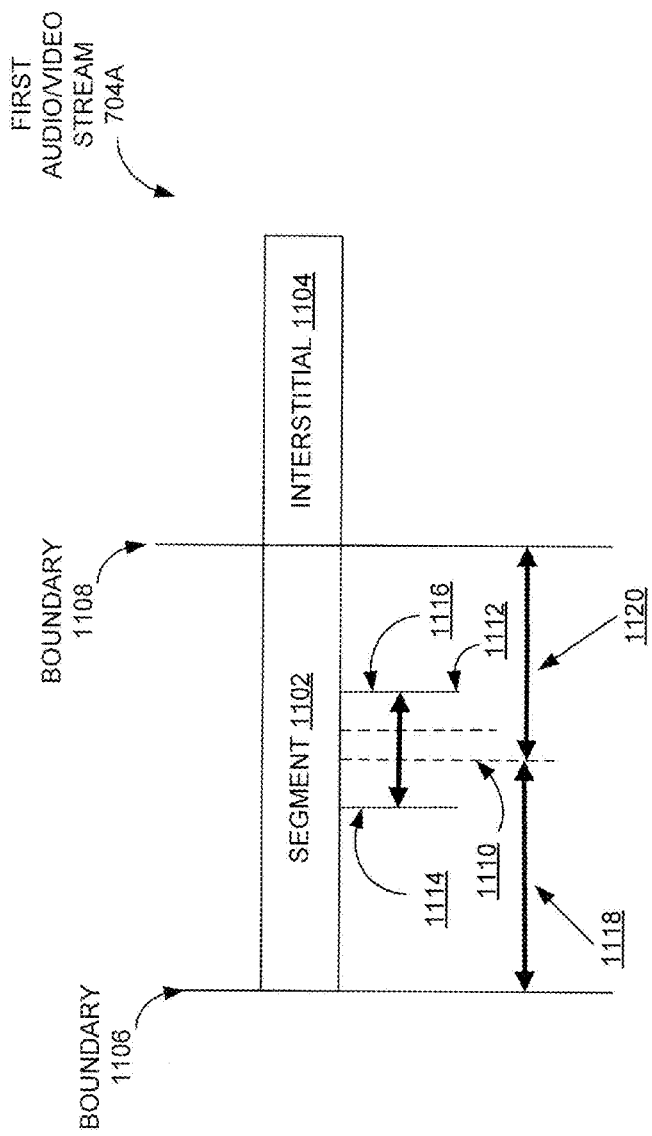
FIG. 11 illustrates a graphical representation of the first presentation stream of FIG. 10.

FIG. 11 illustrates a graphical representation of the first presentation stream of FIG. 10. The first A/V stream 704A includes a segment 1102 and an interstitial 1104. The segment 1102 is bounded by boundaries 1106 and 1108.

The closed captioning data associated with the first A/V stream 704 is utilized to identify a first location within the first A/V stream 704. The location information 706 specifies a video location 1110 utilized to identify the boundaries 1106 and 1108. First, the receiving device 710A processes the closed captioning data associated with the first A/V stream 704 to identify an intermediate location 1112 within the first A/V stream 704. Based upon locating the intermediate location 1112, the receiving device 710A identifies search boundaries 1114 and 1116. The video location 1110 is located within the search boundaries 1114 and 1116. In at least one embodiment, the search boundaries 1114 and 1116 are specified as off-sets relative to the intermediate location 1112.

Responsive to identifying the boundaries 1114 and 1116, the receiving device 710A processes the content of the first A/V stream 704 within the boundaries 1114 and 1116 to identify the video location 1110 corresponding with the signature data 1006. The processing of the content within the search boundaries may be performed as described above in reference to FIG. 1. Responsive to identifying the video location 1110, the receiving device 710A utilizes off-sets 1118 and 1120 to identify the boundaries 1106 and 1108 of the segment 1102.

The receiving device 710A may then operate to output the content within the boundaries 1106 and 1108. The receiving device 710A may also perform a similar process to identify boundaries of the interstitial 1104, and utilize the identified boundaries to determine content to skip during output of a second A/V stream 712. Similar processes may be performed to identify the boundaries of other segments of the first A/V stream 704 to determine content to skip and/or output during presentation of the second A/V stream 712.

In at least one embodiment, the receiving device 710A may be configured to determine whether closed captioning data has been shifted from the original video content corresponding with the closed captioning data. In other words, the receiving device 710A first processes the first A/V stream 704 using the above described closed captioning technique, and then utilizes the signature data technique described above to further refine the identification of boundaries (or locations) within the first A/V stream 704. For example, particular words of closed captioning data may be shifted in either direction from the corresponding video frame. Thus, the receiving device 710A may be operable to initially identify an intermediate location within the first A/V stream 704 based upon the location information 706. The intermediate location may be identified as described above in reference to FIGS. 7-9. Thus, the off-sets corresponding with the intermediate location may point to locations other than the boundaries of a segment.

Figure 12:
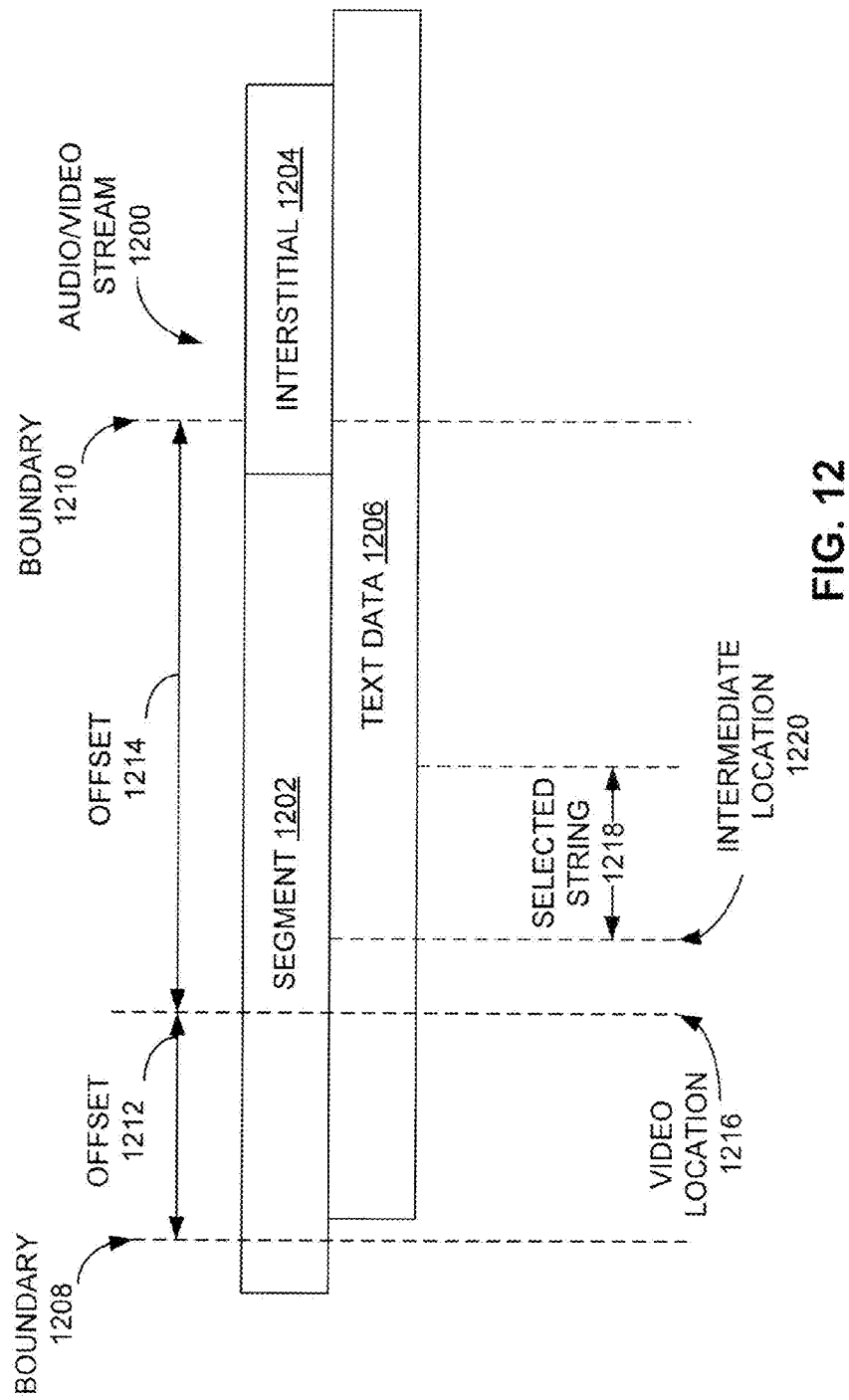
FIG. 12 illustrates an embodiment in which intermediate boundaries of a segment of an A/V stream are identified based on a text string included within the text data associated with the A/V stream.

FIG. 12 illustrates an embodiment in which intermediate boundaries of a segment of an A/V stream 1200 are identified based on a text string included with the text data associated with the A/V stream 1200. FIG. 12 will be discussed in reference to system 1000 of FIG. 10. The A/V stream 1200 includes a segment 1202, an interstitial 1204 and text data 1206. Each of these components is discussed in greater detail below.

In the illustrated example, the location information 706A (see FIG. 10) is intended to identify a video location 1216 within the first A/V stream 1200. More particularly, a selected string of text data specified by the location information 706A (see FIG. 10) corresponds with the video location 1216. Off-sets associated with the video location point to boundaries of the segment 1202. However, the text data 1206 for the A/V stream 1200 has been shifted to the right. This means that a location identified based on the location information 706A will point to incorrect boundaries for the segment 1202. In other words, the boundaries of the segment 1202 identified by the process will be shifted to the right.

To remedy the shifting, the location information 706A (see FIG. 10) received by the receiving device 710A identifies the segment 1202 using a selected string 1218 and offsets 1212 and 1214. In other words, the location information 706A of FIG. 10 is comprised of the selected string 1218 and offsets 1212 and 1214. The receiving device 710A reviews the text data 1206 to locate the selected string 1218. As illustrated in FIG. 12, the selected string 1218 is located at the intermediate location 1220. More particularly, in at least one embodiment, the beginning of the selected string 1218 corresponds with the frame located at the intermediate location 1220. After locating the intermediate location 1220, the receiving device 710A utilizes the negative offset 1212 to identify the intermediate beginning boundary 1208. Likewise, the receiving device 710A utilizes the positive offset 1214 to identify the intermediate ending boundary 1210.

Next, the receiving device 710A compares the signature data 1006A (see FIG. 10) to the audio and/or video data associated with the intermediate location 1220 to determine whether the A/V data is within a specified tolerance compared with the signature data 1006A. In other words, the comparison process minimizes the tolerance between the signature data 1006A and the audio and/or video data at a particular location. If the comparison results in value greater than the specified tolerance, then the receiving device 710A identifies that the closed captioning data has been shifted from the original video location 1216, and begins to identify the amount of the shift.

In at least one embodiment, receiving device 710A may determine the shift amount by moving in either direction from the intermediate location 1220 and comparing the signature data 1006 with the A/V data at the shifted location. If the A/V data at the shifted location results in a comparison within a specified tolerance, then the receiving device identifies the shift amount, and adjusts the intermediate boundaries 1208 and 1210 accordingly to map to the boundaries of the segment 1202. If the comparison is outside of the specified tolerance, then the receiving device 710A keeps shifting in one direction or the other and performs a similar comparison process until the video location 1216 is identified.

The comparison of the signature data 1006 and the A/V data of the first A/V stream may be performed as described above in reference to FIG. 1. In at least one embodiment, a subtraction process may be performed to locate the video location 1216. FIG. 13 illustrates an embodiment of a graphical representation of a subtraction process performed to determine an offset between the video location 1216 and the intermediate location 1220. The signature data 1006A is initially subtracted from the A/V data 1302 corresponding with the intermediate location 1220. If the subtraction results in a value greater than a specified tolerance, then the signature data 1006A is shifted from the intermediate location 1220 and another subtraction process is performed. The shifting and subtraction process is repeated until the receiving device 710A identifies the video location 1216, as illustrated in FIG. 14. The shifting process results in the identification of the adjustment off-set 1402. As described above, the off-sets 1212 and 1214 (see FIG. 12) may then be adjusted by the adjustment off-set 1402 to map to the beginning and ending boundaries of the segment 1202.

While the aforementioned process has been discussed in reference to signature video data, a similar identification process may be utilized in relation to signature audio data. For example, the intermediate location 1220 may be associated with a particular location of corresponding audio data. Thus, offsets may be utilized to locate the video location 1216 in relation to the location of the signature audio data.

Figure 15:
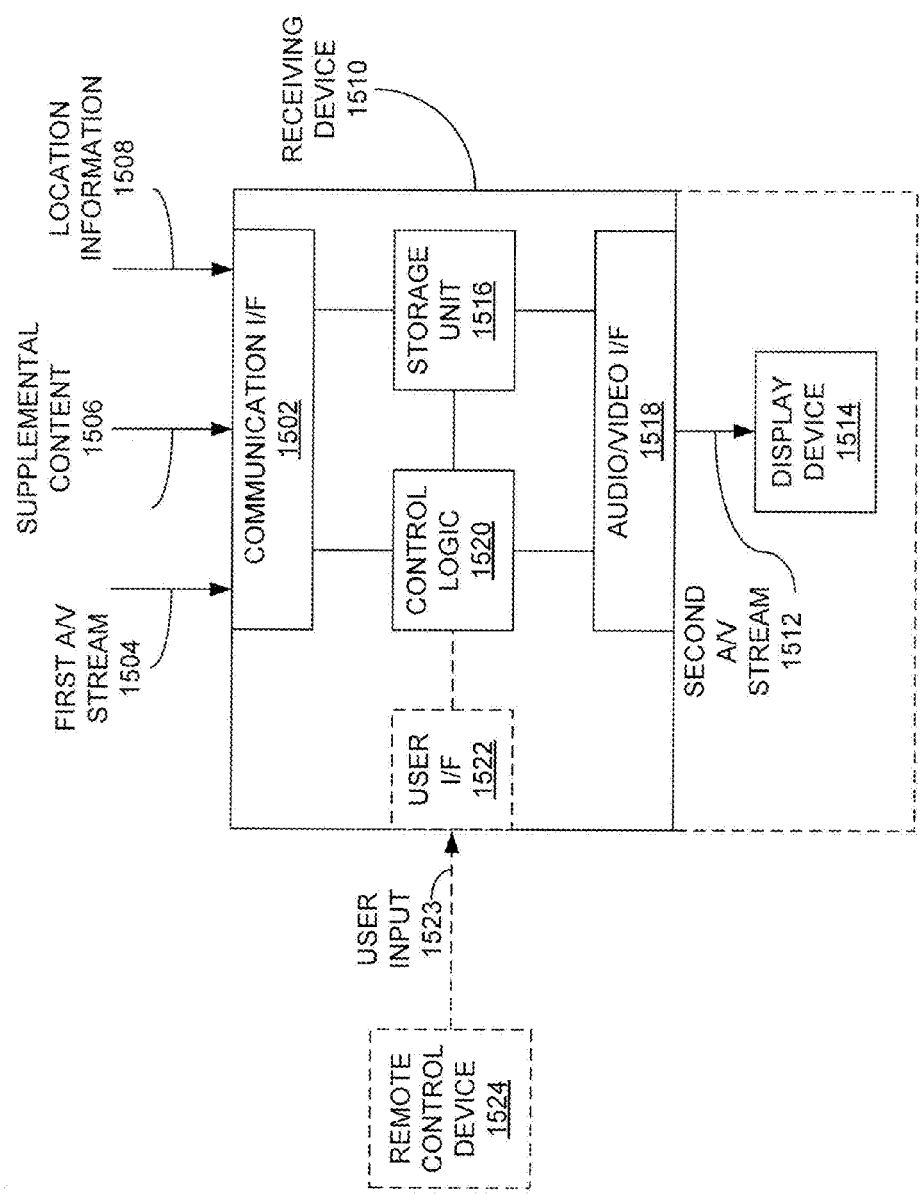
FIG. 15 illustrates a more explicit view of a receiving device according to one embodiment.

A more explicit view of a receiving device 1510 according to one embodiment is illustrated in FIG. 15. The receiving device 1510 includes a communication interface 1502, a storage unit 1516, an A/V interface 1518 and control logic 1520. In some implementations, a user interface 1522 may also be employed in the receiving device 1510. Other components possibly included in the receiving device 1510, such as demodulation circuitry, decoding logic, and the like, are not shown explicitly in FIG. 15 to facilitate brevity of the discussion.

The communication interface 1502 may include circuitry to receive a first A/V stream 1504 and location information 1508. In some embodiments, the communication interface 1502 may optionally receive supplemental content 1506. If the receiving device 1510 is a satellite set-top box, then the communication interface 1502 may be configured to receive satellite programming, such as the first A/V stream 1504, via an antenna from a satellite transponder. If, instead, the receiving device 1510 is a cable set-top box, then the communication interface 1502 may be operable to receive cable television signals and the like over a coaxial cable. In either case, the communication interface 1502 may receive the supplemental content 1506 and the location information 1508 by employing the same technology used to receive the first A/V stream 1504. In another implementation, the communication interface 1502 may receive the supplemental content 1506 and the location information 1508 by way of another communication technology, such as the internet, a standard telephone network, or other means. Thus, the communication interface 1502 may employ one or more different communication technologies, including wired and wireless communication technologies, to communicate with a communication network, such as the communication network 102 of FIG. 1.

Coupled to the communication interface 1502 is a storage unit 1516, which is configured to store both the first A/V stream 1504 and the supplemental content 1506. The storage unit 1516 may include any storage component configured to store one or more such A/V streams. Examples include, but are not limited to, a hard disk drive, an optical disk drive, and flash semiconductor memory. Further, the storage unit 1516 may include either or both volatile and nonvolatile memory.

Communicatively coupled with the storage unit 1516 is an A/V interface 1518, which is configured to output A/V streams from the receiving device 1510 to a display device 1514 for presentation to a user. The A/V interface 1518 may incorporate circuitry to output the A/V streams in any format recognizable by the display device 1514, including composite video, component video, Digital Visual Interface (DVI), High-Definition Multimedia Interface (HDMI), Digital Living Network Alliance (DLNA), Ethernet, Multimedia over Coax Alliance (MOCA), WiFi and IEEE 1394. Data may be compressed and/or transcoded for output to the display device 1514. The A/V interface 1518 may also incorporate circuitry to support multiple types of these or other A/V formats. In one example, the display device 1514, such as a television monitor or similar display component, may be incorporated within the receiving device 1510, as indicated earlier.

In communication with the communication interface 1502, the storage unit 1516, and the A/V interface 1518 is control logic 1520 configured to control the operation of each of these three components 1502, 1516, 1518. In one implementation, the control logic 1520 includes a processor, such as a microprocessor, microcontroller, digital signal processor (DSP), or the like for execution of software configured to perform the various control functions described herein. In another embodiment, the control logic 1520 may include hardware logic circuitry in lieu of, or in addition to, a processor and related software to allow the control logic 1520 to control the other components of the receiving device 1510.

Optionally, the control logic 1520 may communicate with a user interface 1522 configured to receive user input 1523 directing the operation of the receiving device 1510. The user input 1523 may be generated by way of a remote control device 1524, which may transmit the user input 1523 to the user interface 1522 by the use of, for example, infrared (IR) or radio frequency (RF) signals. In another embodiment, the user input 1523 may be received more directly by the user interface 1522 by way of a touchpad or other manual interface incorporated into the receiving device 1510.

The receiving device 1510, by way of the control logic 1520, is configured to receive the first A/V stream 1504 by way of the communication interface 1502, and store the A/V stream 1504 in the storage unit 1516. The receiving device

1510 is also configured to receive the supplemental content 1506 over the communication interface 1502, possibly storing the supplemental content 1506 in the storage unit 1516 as well. The location information 1508 is also received at the communication interface 1502, which may pass the location information 1508 to the control logic 1520 for processing. In another embodiment, the location information 1508 may be stored in the storage unit 1516 for subsequent retrieval and processing by the control logic 1520.

At some point after the location information 1508 is processed, the control logic 1520 generates and transmits a second A/V stream 1512 over the A/V interface 1518 to the display device 1514. In one embodiment, the control logic 1520 generates and transmits the second A/V stream 1512 in response to the user input 1523. For example, the user input 1523 may command the receiving device 1510 to output the first A/V stream 1504 to the display device 1514 for presentation. In response, the control logic 1520 instead generates and outputs the second A/V stream 1512. As described above in reference to FIG. 1, the second A/V stream 1512 includes portions of the A/V data of the first A/V stream 1504, with the supplemental content 1506 also being presented in association with the portions of the first A/V stream 1504. In some embodiments, the supplemental content 1506 may replace portions of the original A/V content of the first A/V stream 1504 at a location specified in the location information 1508, as described in detail above with respect to the first presentation stream 104 of FIG. 1. For example, the first A/V stream 1504 may include portions of a movie that are not appropriate for viewing by children. The supplemental content 1506 may be utilized to replace these portions of the first A/V stream 1504 with more appropriate portions of video content for output in the second A/V stream 1512. In other embodiments, the supplemental content 1506 may be utilized to augment portions of the first A/V stream 1504 which are presented as part of the second A/V stream 1512.

Depending on the implementation, the second A/V stream 1512 may or may not be stored as a separate data structure in the storage unit 1516. In one example, the control logic 1520 generates and stores the entire second A/V stream 1512 in the storage unit 1516. The control logic 1520 may further overwrite the first A/V stream 1504 with the second A/V stream 1512 to save storage space within the storage unit 1516. Otherwise, both the first A/V stream 1504 and the second A/V stream 1512 may reside within the storage unit 1516.

In another implementation, the second A/V stream 1512 may not be stored separately within the storage unit 1516. For example, the control logic 1520 may instead generate the second A/V stream 1512 "on the fly" by transferring selected portions of the audio data and the video data of the first A/V stream 1504 in presentation order from the storage unit 1516 to the A/V interface 1518. At the point at which the supplemental content 1506 indicated by the location information 1508 is to be outputted, the control logic 1520 may then cause the supplemental content 1506 to be transmitted from the storage unit 1516 to the A/V interface 1518 for output to the display device 1514. Once the last of the supplemental content 1506 has been transferred from the storage unit 1516, the control logic 1520 may cause remaining portions of the first A/V stream 1504 which are to be presented to a user to be outputted to the A/V interface 1518 for presentation to the display device 1514.

In one implementation, a user may select by way of the user input 1523 whether the first A/V stream 1504 or the second A/V stream 1512 is outputted to the display device 1514 by way of the A/V interface 1518. In another embodiment, a content provider of the first A/V stream 1504 may prevent the user from maintaining such control by way of additional information delivered to the receiving device 1510.

If more than one portion of supplemental content 1506 is available in the storage unit 1516 to replace a specified portion of the A/V of the first A/V stream 1504 or augment the first A/V stream 1504, then the user may select via the user input 1523 which of the supplemental content 1506 are to replace the corresponding portion of the audio data of the first A/V stream 1504 upon transmission to the display device 1514. Such a selection may be made in a menu system incorporated in the user interface 1522 and presented to the user via the display device 1514. In other embodiments, the control logic 1520 may select the supplemental content 1506 based on various criteria, such as information specified in the location information 1508, user characteristics such a demographic information or user viewing characteristics.

Figure 16:
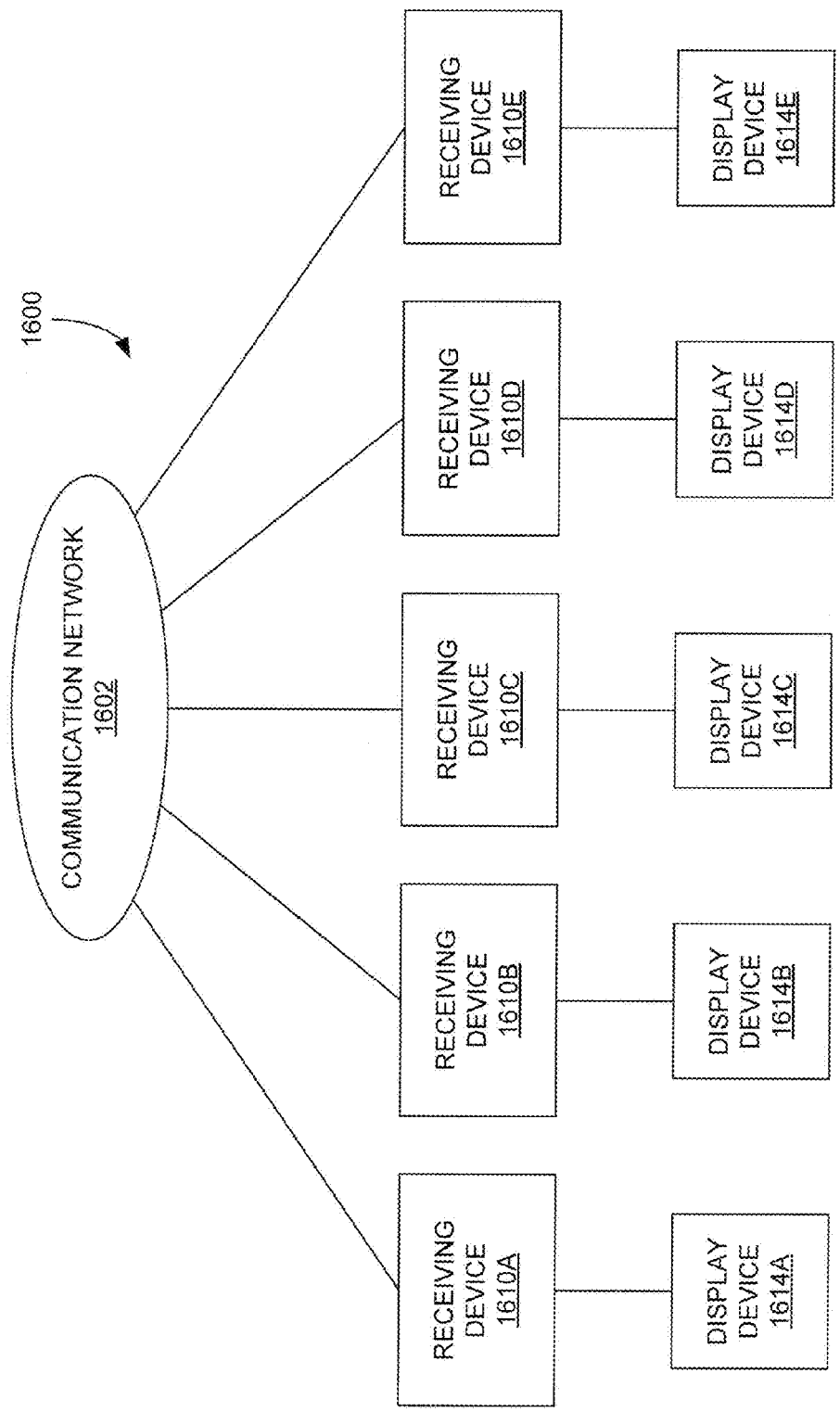
FIG. 16 illustrates an embodiment of a system including multiple receiving devices coupled to a communication network to receive A/V streams.

In a broadcast environment, such as that depicted in the system 1600 of FIG. 16, multiple receiving devices 1610A-E may be coupled to a communication network 1602 to receive A/V streams, any of which may be recorded, in whole or in part, by any of the receiving devices 1610A-E. In conjunction with any number of these A/V streams, supplemental or substitute content serving to replace content in an A/V stream or to augment content in an A/V stream, as well as the location information for portions of the A/V stream which are to be skipped and/or presented to a user, may be transferred to the multiple receiving devices 1610A-E. In response to receiving the A/V streams, each of the receiving devices 1610A-E may record any number of the A/V streams received. For any supplemental or substitute content and associated location information that are transmitted over the communication network 1602, each receiving device 1610A-E may then review whether the received A/V data segments and location information are associated with an A/V stream currently stored in the device 1610A-E. If the associated stream is not stored therein, then the receiving device 1610A-E may delete or ignore the related A/V data segment and location information received.

In another embodiment, instead of broadcasting each possible supplemental or substitute content and related location information, the transfer of an A/V stream stored within the receiving device 1610A-E to an associated display device 1614A-E may cause the receiving device 1610A-E to query the communication network 1602 for any outstanding supplemental or substitute content that apply to the stream to be presented. For example, the communication network 1602 may comprise an internet connection. As a result, the broadcasting of each portion of supplemental or substitute content and related location information would not be required, thus potentially reducing the amount of consumed bandwidth over the communication network 1602.

Figure 17:
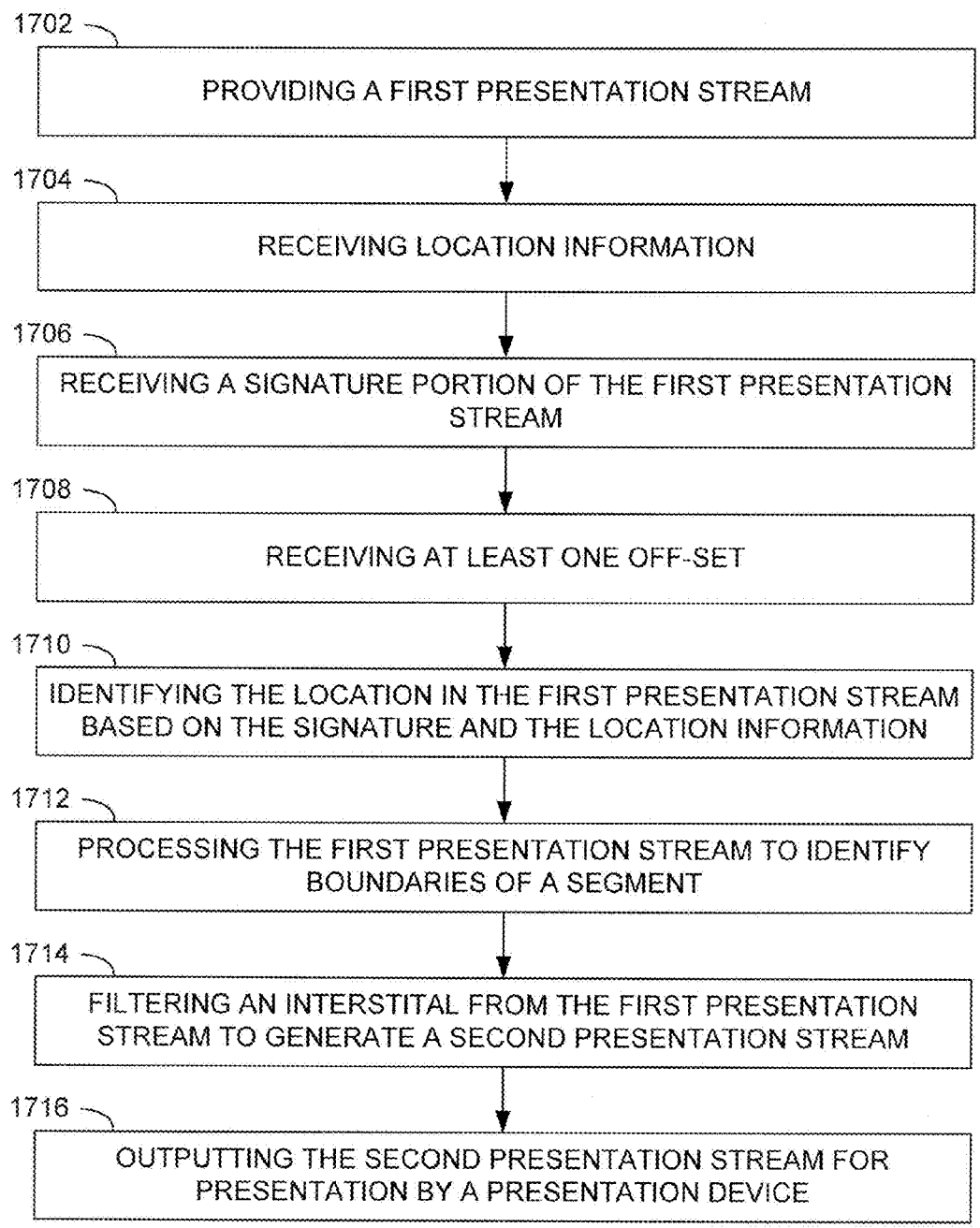
FIG. 17 illustrates an embodiment of a process for outputting a stream of data.

FIG. 17 illustrates an embodiment of a process for outputting a stream of data. More particularly, the process of FIG. 17 is operable for filtering portions of a presentation stream during output of the presentation stream. The process of FIG. 17 will be discussed in reference to filtering interstitials from a presentation stream, but it is to be appreciated that the process of FIG. 17 may be operable to filter any portion of a presentation stream. The process of FIG. 17 may include other operations not illustrated for the sake of brevity.

The process includes providing a first presentation stream including at least one segment of a show and at least one interstitial of the show (operation 1702). In at least one embodiment, operation 1702 comprises receiving the presentation stream from an external source. Operation 1702 may optionally include storing the first presentation stream for subsequent playback. In other embodiment, operation 1702 may include accessing the first presentation stream from a storage device.

The process further comprises receiving location information referencing a location within the first presentation stream (operation 1704). The process also includes receiving a signature of a portion of the first presentation stream corresponding with the location (operation 1706) and receiving at least one-offset, specified relative to the location (operation 1708).

The process further includes identifying the location in the first presentation stream based on the signature and the location information (operation 1710). Responsive to identifying the location, the process includes processing the first presentation stream to identify boundaries of the segment of the show based on the identified location and the off-set (operation 1712). The process further includes filtering the interstitial from the first presentation stream to generate a second presentation stream including the segment of the show (operation 1714). The process also includes outputting the second presentation stream for presentation by a presentation device (operation 1716).

Figure 18:
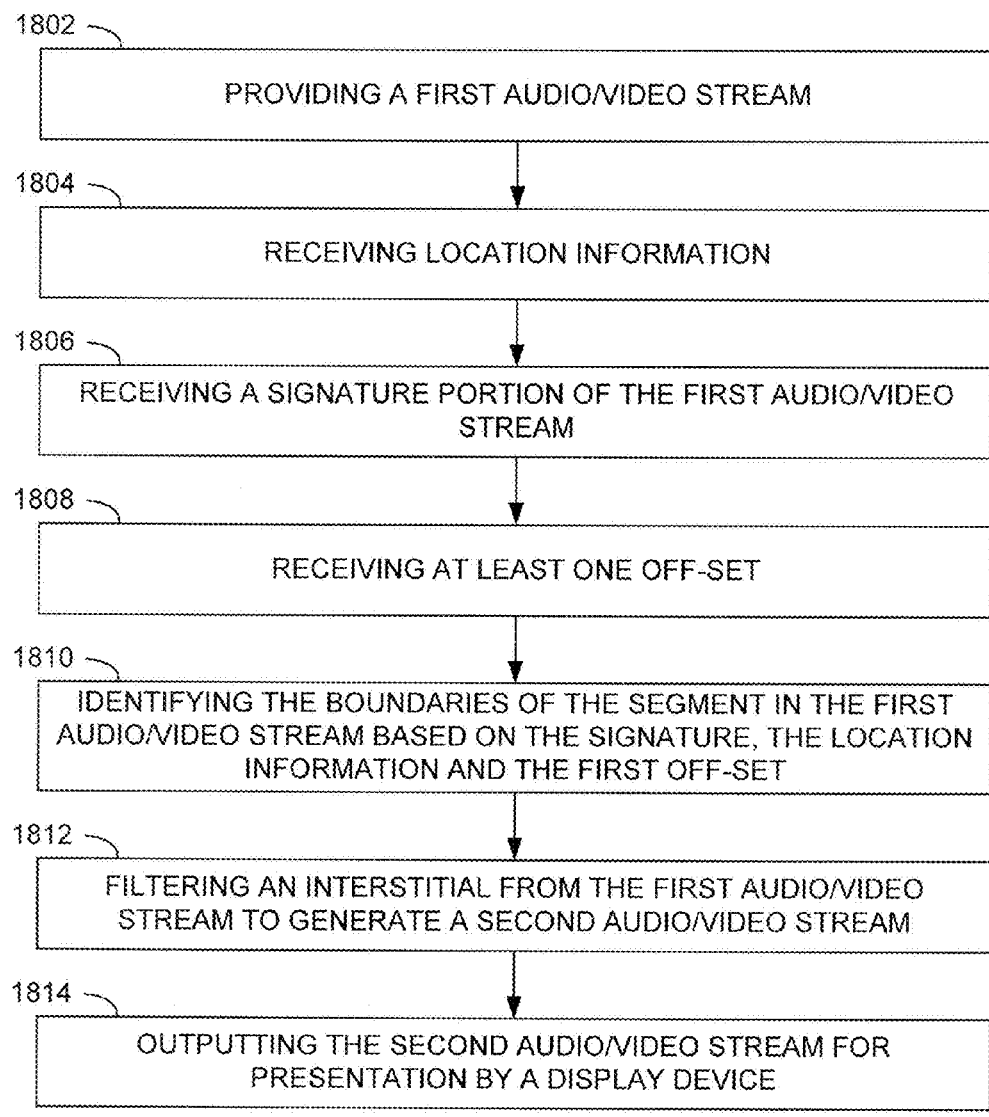
FIG. 18 illustrates an embodiment of a process for filtering content from an audio/video stream using signature data and metadata that references supplemental data of an audio/video stream.

FIG. 18 illustrates an embodiment of a process for filtering content from an audio/video stream using signature data and metadata that references supplemental data of an audio/video stream. The process of FIG. 18 may include other operations not illustrated for the sake of brevity.

The process includes providing a first audio/video stream including at least one segment of a show, at least one interstitial of the show and text data, e.g., closed captioning data (operation 1802). For example, a DVR may record a broadcast TV signal for subsequent playback to a user. In some embodiments, the audio/video stream may include associated audio data. In at least one embodiment, operation 1802 comprises accessing video content including subtitles from a storage medium, such as a DVD.

The process further includes receiving location information referencing the text data to identify a video location with the first audio/video stream (operation 1804). The process further includes receiving a signature of a portion of the first audio/video stream associated with the video location (operation 1806) and receiving at least one first off-set specified relative to the video location (operation 1808).

Operation 1810 comprises processing the first audio/video stream to identify boundaries of the at least one segment of the show based on the signature, the location information and the first off-set. Responsive to identifying the boundaries of the segment, the process further includes filtering the interstitial from the first audio/video stream to generate a second audio/video stream including the segment of the video (operation 1812). The second audio/video stream is responsively outputted for presentation by a display device (operation 1814).

Figure 19:
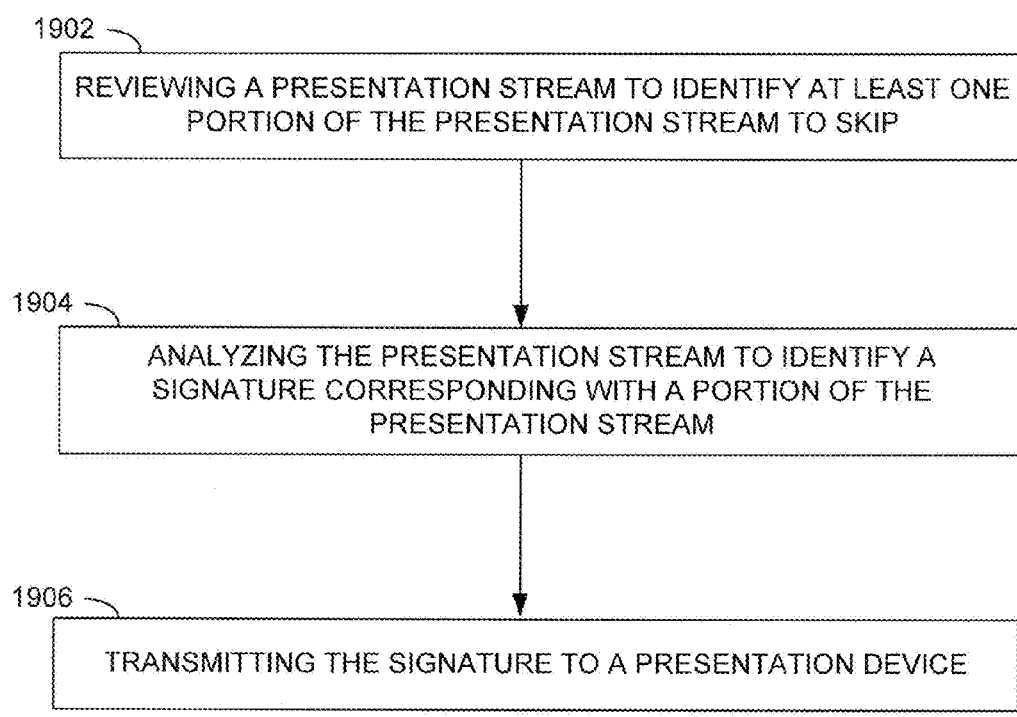
FIG. 19 illustrates an embodiment of a process for creating location information for utilization by the processes of FIGS. 17 and 18.

FIG. 19 illustrates an embodiment of a process for creating location information for utilization by the processes of FIGS. 17 and 18. The operation of FIG. 19 is discussed in reference to location information and signature information for a television program. However, it is to be appreciated that the operation of the process of FIG. 19 may be applied to create location information and signature data for other types of presentation stream content. The operations of the process of FIG. 19 are not all-inclusive, and may comprise other operations not illustrated for the sake of brevity.

After recording a television show, a human operator reviews a presentation stream to identify at least one portion of the presentation stream to skip during subsequent presentation (operation 1902). For example, the human operator may identify the boundaries of interstitials of a television program.

The process further includes analyzing the presentation stream to identify a signature corresponding with a portion of the presentation stream that identifies at least one boundary of the portion of the presentation stream (operation 1904). For example, the process may include identifying a particular sample of audio data, video data or a combination thereof that is significantly unique within the presentation stream to identify a particular video location. In at least one embodiment, operation 1904 includes identifying a significantly unique average luminance value of a particular frame or frames of video data, or a significantly unique luminance transition value between two frames. In some embodiments, operation 1904 may include identifying a particular sample of output of audio data, such as an output power, that is significantly unique to identify the particular location in the presentation stream. If the identified location is not located at the boundary of the segment, then the process further includes determining an offset of the boundary relative to the location of the signature. If the video location identifies multiple boundaries, then multiple off-sets may be determined that each point to a separate boundary.

The process further includes transmitting the signature to a presentation device (operation 1906). The presentation device utilizes the signature to skip the portion of the audio/video stream specified by the boundary during presentation of the presentation stream. If operation 1904 results in the identification of off-set data, then operation 1906 further includes transmitting the off-set data to the presentation device in association with the signature.

In accordance with the teachings above, a presentation device may also utilize text data to identify boundaries of a segment. Thus, the process of FIG. 19 may also include parsing text data associated with the audio/video stream to identify a text string in the text data that identifies the boundary. For example, a significantly unique text string may be identified that is proximate a particular segment of content. The text string is then provided to the presentation device for utilization in association with the signature data as defined above to identify portions of the audio/video stream to skip during presentation.

Figure 20:
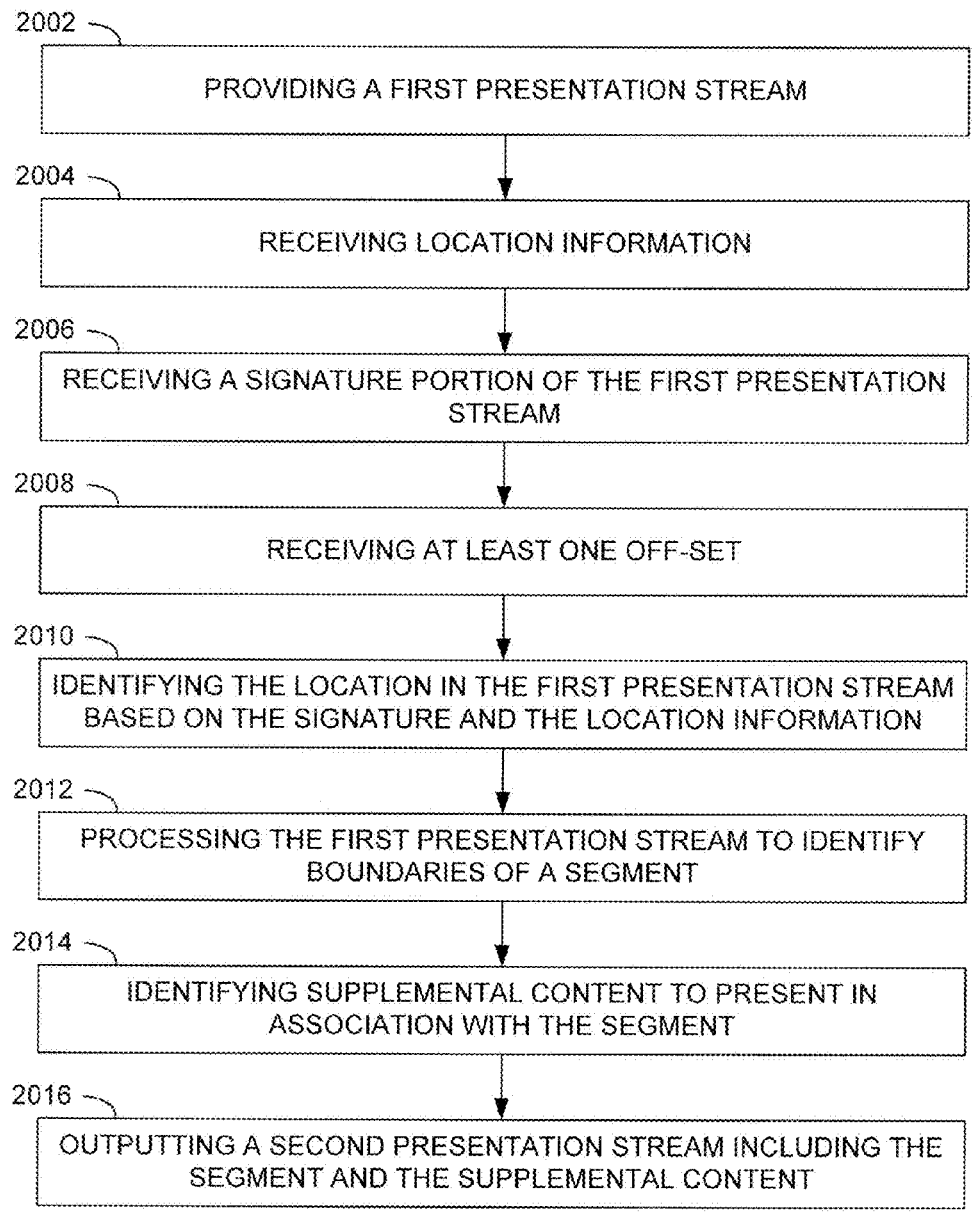
FIG. 20 illustrates an embodiment of a process for outputting a stream of data.

FIG. 20 illustrates an embodiment of a process for outputting a stream of data. More particularly, the process of FIG. 20 is operable for replacing portions of a presentation stream during output of the presentation stream. The process of FIG. 20 may include other operations not illustrated for the sake of brevity.

The process includes providing a presentation stream including at least one segment of a show and at least one interstitial of the show (operation 2002). In one embodiment, operation 2002 comprises recording the show from a broadcast source, such as a terrestrial broadcast signal, cable television signal, satellite television signal or IP television stream. In another embodiment, operation 2002 comprises accessing the first presentation stream from a storage medium, such as an optical disk.

The process further includes receiving location information referencing a location within the first presentation stream (operation 2004). The process also includes receiving a signature of a portion of the first presentation stream corresponding with the location (operation 2006) and receiving at least one off-set specified relative to the location (operation 2008). The data received in each of operations 2004-2008 may be received separately or in any combination depending on desired design criteria.

The process further includes identifying the location in the first presentation stream based on the signature and the location information (operation 2010). The process further includes processing the first presentation stream to identify boundaries of the segment of the show based on the identified location and the off-set (operation 2012). The location may be identified based on the signature in accordance with any of the techniques described above. The identification process may be further augmented based on processing of text data, e.g., closed captioning data as described above.

The process further comprises identifying supplemental content to present in association with the segment of the show (operation 2014). The supplemental content may be identified based on data internal or external to the first presentation stream or the location information. For example, the location information may include identifying information that specifies the supplemental content. In another embodiment, the supplemental content may be identified based on the subject matter of the first presentation stream or based on user viewing characteristics.

The process further includes outputting a second presentation stream for presentation on a presentation device (operation 2016). The second presentation stream includes the segment of the show and the supplemental content. The supplemental content may be inserted into any logical location of the first presentation stream. For example, the supplemental content may replace other content in the first presentation stream. In other words, the supplemental content is substitute content. In this scenario, the process may additionally include identifying the content to be replaced in the first presentation stream. In other embodiments, the supplemental content may be utilized to augment the content in the first presentation stream, and may be inserted either before or after the identified segment.

As described above, the identification techniques described herein may be utilized for identifying multiple segments of content of a presentation stream into various logical chapters, scenes or other sections and the like. The segments of a presentation stream may then be selectably experienced by a user. In other words, a user may select which of the segments they desire to view, and an entertainment device may automatically present the selected segments, automatically skipping over the undesignated segments of the presentation stream.

Figure 21:
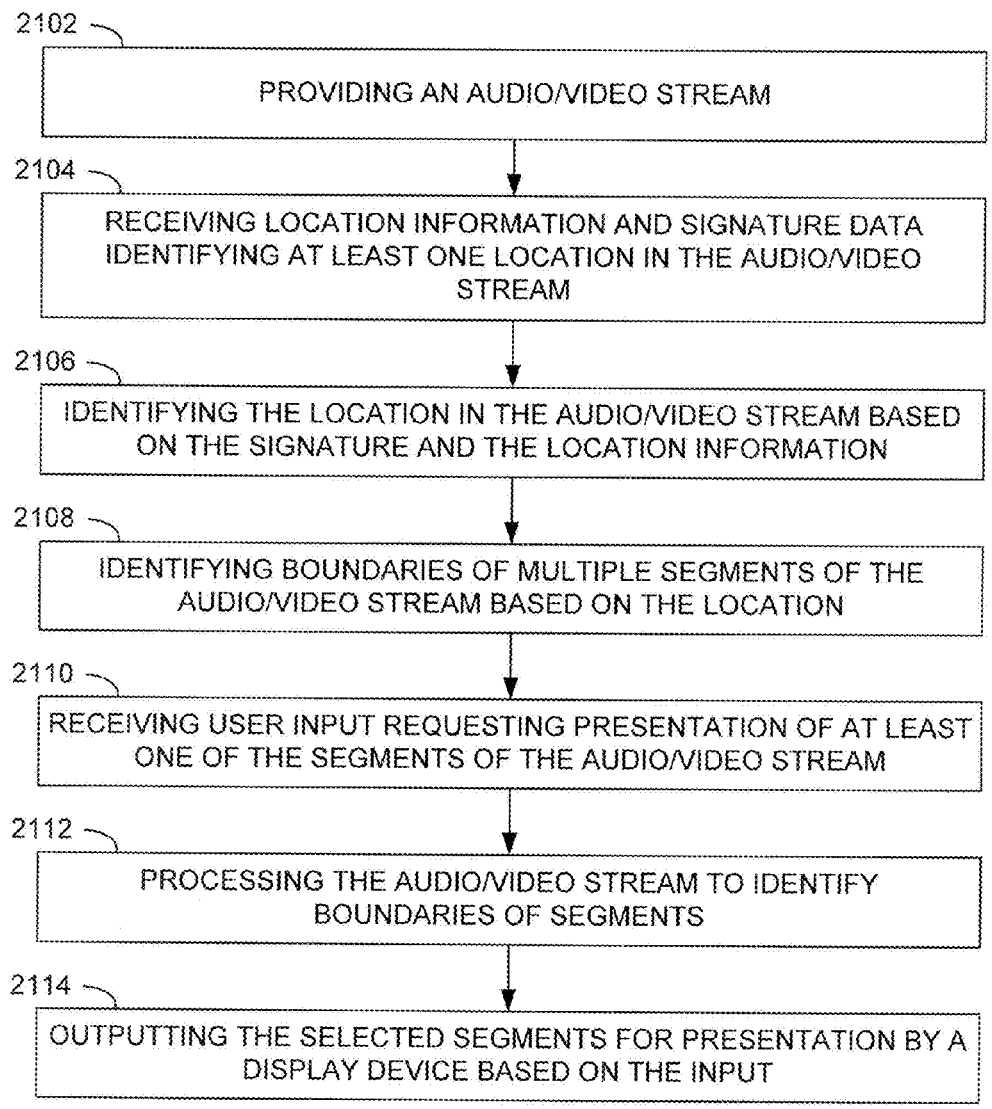
FIG. 21 illustrates an embodiment of a process for processing an audio/video stream.

FIG. 21 illustrates an embodiment of a process for processing an audio/video stream. The process of FIG. 21 will be described in reference to processing a recorded broadcast television stream. However, it is to be appreciated that the process of FIG. 21 may be applied to processing other types of A/V streams. The process of FIG. 21 may include other operations not illustrated for the sake of brevity.

The process includes providing an audio/video stream (operation 2102) and receiving location information and signature data identifying at least one location within an audio/video stream (operation 2104).

The process further includes identifying the location in the audio/video stream based on the signature and the location information (operation 2106). The process further includes identifying boundaries of multiple segments of the audio/video stream based on the location (operation 2108). In some embodiments, multiple sets of location information may be utilized to identify multiple segments of the audio/video stream. The location may be identified based on the signature in accordance with any of the techniques described above. The identification process may be further augmented based on processing of text data, e.g., closed captioning data as described above.

The process further includes receiving user input requesting presentation of at least one of the segments of the audio/video stream (operation 2110). For example, a selection menu of the identified segments may be presented to the user including available segments of the television program. The presented menu may indicate each of the segments of the audio/video stream along with descriptions of the segments. In at least one embodiment, the menu is generated based on information included in the location information. The user may responsively select one or more of the available segments for presentation. The subset of the segments of the presentation stream to be presented may be contiguous or non-contiguous depending on the user input.

The process further includes outputting the selected segments for presentation by a display device based on the input (operation 2112). The selected segments are then responsively outputted for presentation, with the undesignated segments skipped during presentation. For example, a user may select particular news stories that they desire to view, and the recording device may output the selected news stories back-to-back, skipping presentation of undesignated segments interspersed therebetween.

Using the process of FIG. 21, a user may effectively view a subset of the segments of an A/V stream in the original temporal order of the segments, skipping output of undesignated segments of the A/V stream. In some embodiments, a user may designate a different presentation order for the segments of the A/V stream than the original presentation order of the segments. This allows the user to reorder the content of the recorded A/V stream.

In some embodiments, a user may be restricted from temporally moving through particular segments of the A/V stream at a non-real time presentation rate of the A/V stream. In other words, a DVR may automatically output particular segments of the A/V stream without skipping over or otherwise fast forwarding through the segments, regardless of whether a user provides input requesting fast forwarding or skipping through the segment. For example, commercials within a television program may be associated with restrictions against fast forwarding or skipping, and a recording device may automatically present the commercial segments regardless of the receipt of user input requesting non-presentation of the segments.

To effectuate this feature, a receiving device initially identifies the boundaries of the segments of the presentation stream. The identification of boundaries may be performed in accordance with any of the techniques described above. The receiving device additionally identifies any restrictions imposed upon particular segments of the audio/video stream. In at least one embodiment, restrictions may be specified for particular segments in the location information received by the receiving device. When processing the content of the presentation stream, the receiving device uses the identified restrictions to determine whether to allow particular features associated with output of the presentation stream, such as fast-forwarding and the like.

Although specific embodiments were described herein, the scope of the invention is not limited to those specific embodiments. The scope of the invention is defined by the following claims and any equivalents therein.

What is claimed is:

1. A method for processing an audio/video stream, the method comprising:

receiving location information including a text string associated with a first video location within the audio/video stream, the text string referencing closed captioning data associated with the audio/video stream to identify the first video location within the audio/video stream, the location information being received separately from the audio/video stream;

receiving a signature of a portion of the audio/video stream, wherein the signature refers to waveform characteristics of the portion of the audio/video stream;

receiving at least one search boundary offset specified relative to the first video location;

processing the location information and the closed captioning data to locate an instance of the text string in the closed captioning data;

identifying an intermediate video location within the audio/video stream, based on the instance of the text string located in the closed captioning data;

applying the at least one search boundary offset to the identified intermediate video location to identify search boundaries within the audio/video stream;

processing content of the audio/video stream within the search boundaries to locate boundaries of a segment of the audio/video stream, based on the received signature and at least one segment boundary offset associated with the received signature;

receiving user input requesting presentation of the segment of the audio/video stream; and outputting the segment for presentation by a display device, wherein the outputting uses the located boundaries of the segment.

2. The method of claim 1, wherein receiving user input further comprises:

generating a selection menu that includes the segment of the audio/video stream;

outputting the selection menu for presentation by the display device; and receiving a user selection of the segment responsive to outputting the selection menu.

3. The method of claim 1, wherein the signature comprises a search portion of audio data of the audio/video stream, and wherein processing content of the audio/video stream within the search boundaries further comprises:

processing the audio data of the audio/video stream within the search boundaries to identify a signature-based video location corresponding with the portion of the audio data.

4. The method of claim 1, wherein the signature comprises a portion of video data of the audio/video stream, and wherein processing content of the audio/video stream within the search boundaries further comprises:

processing the video data of the audio/video stream within the search boundaries to identify a signature-based video location corresponding with the portion of the video data.

5. A method for processing an audio/video stream, the method comprising:

receiving location information identifying a first location within an audio/video stream, the location information including a text string corresponding to closed captioning data for the audio/video stream, and the location information including at least one search boundary offset relative to the first location;

receiving a signature of a portion of the audio/video stream, the signature identifying a transition in the video data from a first luminance value for a first frame of the video data to a second luminance value for a second frame of the video data;

processing the closed captioning data to locate an instance of the text string in the closed captioning data and to identify an intermediate location within the audio/video stream based on the instance of the text string;

applying the at least one search boundary offset to the identified intermediate location to identify search boundaries within the audio/video stream;

computing average luminance values for a plurality of frames of the video data of the audio/video stream, wherein the plurality of frames are within the search boundaries;

processing the average luminance values to identify the transition from the first luminance value to the second luminance value based on the signature, the transition corresponding with a signature-based location within the audio/video stream;

identifying boundaries of a segment of the audio/video stream based on the signature-based location;

receiving user input requesting presentation of the segment of the audio/video stream; and outputting the segment for presentation by a display device, wherein the outputting uses the identified boundaries of the segment.

6. The method of claim 5, wherein receiving the location information and the signature further comprise:

receiving the location information in association with the signature separately from the audio/video stream.

7. The method of claim 5, wherein identifying the boundaries of the segment of the audio/video stream further comprises:

receiving a segment boundary offset, specified relative to the signature-based location, the segment boundary offset specifying a boundary of the segment of the audio/video stream.

8. The method of claim 5, wherein receiving user input further comprises:

generating a selection menu that includes the segment of the audio/video stream;

outputting the selection menu for presentation by the display device; and receiving a user selection of the segment of the audio/video stream from the selection menu.

9. A digital video recorder comprising:

a communication interface that receives an audio/video stream including a plurality of segments and that further receives location information identifying a first location within the audio/video stream, a signature of a portion of the audio/video stream, and at least one search boundary offset specified relative to the first location, wherein the location information, the signature and the at least one search boundary offset are received separately from the audio/video stream, wherein the signature identifies a transition in the video data from a first luminance value for a first frame of the video data to a second luminance value for a second frame of the video data, and wherein the location information includes a text string corresponding to closed captioning data for the audio/video stream;

a storage medium; and control logic communicatively coupled to the communication interface and the storage medium that is configured to:

process the closed captioning data to locate an instance of the text string in the closed captioning data and to identify an intermediate location within the audio/video stream based on the instance of the text string;

apply the at least one search boundary offset to the identified intermediate location to identify search boundaries within the audio/video stream;

compute average luminance values for a plurality of frames of the video data of the audio/video stream, wherein the plurality of frames are within the search boundaries;

process the average luminance values to identify the transition from the first luminance value to the second luminance value based on the signature, the transition corresponding with a signature-based location within the audio/video stream;

identify the boundaries of one of the plurality of segments of the audio/video stream based on the signature-based location and at least one segment boundary offset;

receive user input requesting presentation of the one of the plurality of segments of the audio/video stream; and output the one of the plurality of segments for presentation by a display device, wherein the outputting uses the identified boundaries.

10. The digital video recorder of claim 9, wherein the control logic is configured to:

generate a selection menu that includes the one of the plurality of segments of the audio/video stream;

output the selection menu for presentation by the display device; and receive a user selection of the one of the plurality of segments of the audio/video stream from the selection menu.

11. A digital video recorder comprising:

a communication interface that receives an audio/video stream including a plurality of segments and associated closed captioning data, the communication interface further receiving location information including a text string referencing the closed captioning data to identify a first video location within the audio/video stream, and the communication interface further receiving a signature of a portion of the audio/video stream, and at least one search boundary offset specified relative to the first video location, wherein the signature refers to waveform characteristics of the portion of the audio/video stream;

a storage medium;

control logic communicatively coupled to the communication interface and the storage medium configured to:

process the location information and the closed captioning data to locate an instance of the text string in the closed captioning data;

identify an intermediate video location within the audio/video stream, based on the instance of the text string located in the closed captioning data;

apply the at least one search boundary offset to the identified intermediate video location to identify search boundaries within the audio/video stream;

process content of the audio/video stream within the search boundaries to locate boundaries of a segment of the audio/video stream, based on the received signature and at least one segment boundary offset associated with the received signature;

receive user input requesting presentation of the segment of the audio/video stream; and an audio/video output interface that outputs the segment for presentation by a display device, wherein the outputting uses the located boundaries of the segment.

12. The digital video recorder of claim 11, wherein the control logic is configured to:

generate a selection menu that includes the segment of the audio/video stream;

output the selection menu for presentation by the display device; and receive a user selection of the segment responsive to outputting the selection menu.

13. The digital video recorder of claim 11, wherein the signature comprises a search portion of audio data of the audio/video stream, and wherein the control logic processes the audio data of the audio/video stream within the search boundaries to identify a signature-based video location corresponding with the portion of the audio data.

14. The digital video recorder of claim 11, wherein the signature comprises a portion of video data of the audio/video stream, and the control logic processes the video data of the audio/video stream within the search boundaries to identify a signature-based video location corresponding with the portion of the video data.

* * * * *